(12) United States Patent
Yamanashi et al.

(10) Patent No.: US 7,636,055 B2
(45) Date of Patent: *Dec. 22, 2009

(54) SIGNAL DECODING APPARATUS AND SIGNAL DECODING METHOD

(75) Inventors: Tomofumi Yamanashi, Tokyo (JP); Kaoru Sato, Kanagawa (JP); Toshiyuki Morii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/170,232

(22) Filed: Jul. 9, 2008

(65) Prior Publication Data

US 2008/0297380 A1    Dec. 4, 2008

Related U.S. Application Data

(63) Continuation of application No. 10/585,313, filed as application No. PCT/JP2004/019016 on Dec. 20, 2004, now Pat. No. 7,411,522.

(30) Foreign Application Priority Data

| Jan. 8, 2004 | (JP) | ............................... 2004-003402 |
| Jul. 30, 2004 | (JP) | ............................... 2004-224240 |

(51) Int. Cl.
  *H03M 7/00* (2006.01)
  *G01L 19/12* (2006.01)
(52) U.S. Cl. ........................... 341/50; 704/219; 700/94
(58) Field of Classification Search ................. 341/50, 341/51; 700/94; 704/201, 219
See application file for complete search history.

(56) References Cited

U.S. PATENT DOCUMENTS

| 5,703,652 A | 12/1997 | Kondo et al. |
| 5,825,313 A | 10/1998 | Kondo et al. |
| 6,208,957 B1 | 3/2001 | Nomura |
| 6,301,558 B1 | 10/2001 | Isozaki |

(Continued)

FOREIGN PATENT DOCUMENTS

EP    1204095    5/2002

(Continued)

OTHER PUBLICATIONS

PCT International Search Report dated Apr. 12, 2005.

(Continued)

*Primary Examiner*—Howard Williams
(74) *Attorney, Agent, or Firm*—Dickinson Wright, PLLC

(57) ABSTRACT

A signal decoding apparatus preventing substantial noise from being produced when transmission error occurs during decoding of scalable-coded information. In this signal decoding apparatus, a coded information operation section (601) performs error detection for base layer coded information, first enhancement layer coded information and second enhancement layer coded information using transmission error detection bits. A decoding operation control section (602) performs ON/OFF control of control switches (606, 607) in accordance with pattern information indicating error detection results and bit rate patterns, and controls the sampling frequencies of sampling frequency adjustment sections (608, 609). A base layer decoding section (603), first enhancement layer decoding section (604) and second enhancement layer decoding section (605) perform decoding of coded information or frame loss compensation processing, depending on error detection results and bit rates. Sampling frequency adjustment sections (608, 609) adjust the sampling frequency of the decoded signal.

4 Claims, 17 Drawing Sheets

U.S. PATENT DOCUMENTS

| | | | |
|---|---|---|---|
| 6,757,860 B2 | 6/2004 | Choi et al. | |
| 7,272,556 B1* | 9/2007 | Aguilar et al. | 704/230 |
| 7,299,174 B2* | 11/2007 | Sato et al. | 704/219 |
| 2002/0031182 A1 | 3/2002 | Kishi | |
| 2005/0091051 A1 | 4/2005 | Moriya | |

FOREIGN PATENT DOCUMENTS

| | | |
|---|---|---|
| JP | 9102743 | 4/1997 |
| JP | 9102744 | 4/1997 |
| JP | 10233692 | 9/1998 |
| JP | 1130997 | 2/1999 |
| JP | 2000352999 | 12/2000 |
| JP | 2001230675 | 8/2001 |
| JP | 200234043 | 1/2002 |
| JP | 2002141810 | 5/2002 |
| JP | 2003241799 | 8/2003 |
| WO | 03/077425 | 9/2003 |

OTHER PUBLICATIONS

M. R. Schroeder, et al.; "Code-Excited Linear Prediction (CELP): High-Quality Speech at Very Low Bit Rates," IEEE, Proc., ICASSP, 1985, pp. 937-940.

J Herre et al., "Overview of MPEG-4 audio and its applications in mobile communications," Communication Technology Proceedings, 2000. WCC-ICCT 2000. WCC-ICCT 2000. International Conference on, Beijing, China, Aug. 21-25, 2000, IEEE, US, vol. 1, Aug. 21, 2000, pp. 604-613.

* cited by examiner

| PATTERN | TRANSMISSION MODE INFORMATION (bit rate) | TRANSMISSION ERROR INFORMATION | | |
|---|---|---|---|---|
| | | BASE LAYER | FIRST ENHANCEMENT LAYER | SECOND ENHANCEMENT LAYER |
| A | 1 | 0 | 0 | 0 |
| B | 1 | 0 | 0 | 1 |
| C | 1 | 0 | 1 | — |
| D | 1 | 1 | — | — |
| E | 2 | 0 | 0 | |
| F | 2 | 0 | 1 | |
| G | 2 | 1 | — | |
| H | 3 | 0 | | |
| I | 3 | 1 | | |

FIG.7

| PATTERN | CONTROL SWITCH | | SAMPLING FREQUENCY | | FRAME LOSS COMPENSATION INFORMATION | | |
|---|---|---|---|---|---|---|---|
| | 606 | 607 | 608 | 609 | 603 | 604 | 605 |
| A | ON | ON | SR$_{input}$ | SR$_{input}$ | 0 | 0 | 0 |
| B | ON | OFF | SR$_{input}$ | SR$_{input}$ | 0 | 0 | 0 |
| C | OFF | OFF | SR$_{input}$ | NONE | 0 | 0 | 0 |
| D | ON | ON | SR$_{input}$ | SR$_{input}$ | 1 | 1 | 1 |
| E | ON | OFF | SR$_{enh1}$ | NONE | 0 | 0 | 0 |
| F | OFF | OFF | SR$_{enh1}$ | NONE | 0 | 0 | 0 |
| G | ON | OFF | NONE | NONE | 1 | 1 | 0 |
| H | OFF | OFF | NONE | NONE | 0 | 0 | 0 |
| I | OFF | OFF | NONE | NONE | 1 | 0 | 0 |

FIG.8

| PATTERN | TRANSMISSION MODE INFORMATION (bit rate) | TRANSMISSION ERROR INFORMATION | | |
|---|---|---|---|---|
| | | BASE LAYER | FIRST ENHANCEMENT LAYER | SECOND ENHANCEMENT LAYER |
| A | 1 | 0 | 0 | 0 |
| B | 1 | 0 | 0 | 1 |
| C | 1 | 0 | 1 | — |
| D | 1 | 1 | — | — |
| E | 2 | 0 | 0 | / |
| F | 2 | 0 | 1 | / |
| G | 2 | 1 | — | / |
| H | 3 | 0 | / | / |
| I | 3 | 1 | / | / |

FIG.13

| PATTERN | CONTROL SWITCH | | | | | FRAME LOSS COMPENSATION INFORMATION | | |
|---|---|---|---|---|---|---|---|---|
| | 1206 | 1207 | 1208 | 1209 | 1210 | 1203 | 1204 | 1205 |
| A | ON | ON | ON | ON | SECOND ENHANCEMENT LAYER SIDE ON | 0 | 0 | 0 |
| B | ON | ON | ON | OFF | SECOND ENHANCEMENT LAYER SIDE ON | 0 | 0 | 0 |
| C | ON | OFF | ON | OFF | SECOND ENHANCEMENT LAYER SIDE ON | 0 | 0 | 0 |
| D | ON | ON | ON | ON | SECOND ENHANCEMENT LAYER SIDE ON | 1 | 1 | 1 |
| E | ON | ON | OFF | OFF | FIRST ENHANCEMENT LAYER SIDE ON | 0 | 0 | 0 |
| F | ON | OFF | OFF | OFF | FIRST ENHANCEMENT LAYER SIDE ON | 0 | 0 | 0 |
| G | ON | ON | OFF | OFF | FIRST ENHANCEMENT LAYER SIDE ON | 1 | 1 | 0 |
| H | OFF | OFF | OFF | OFF | BASE LAYER SIDE ON | 0 | 0 | 0 |
| I | OFF | OFF | OFF | OFF | BASE LAYER SIDE ON | 1 | 0 | 0 |

FIG.14

| PATTERN | TRANSMISSION MODE INFORMATION (bit rate) | PRE-ADJUSTMENT TRANSMISSION MODE INFORMATION (bit rate) |
|---|---|---|
| A' | 1 | 1 |
| B' | 1 | 2 |
| C' | 1 | 3 |
| D' | 2 | 2 |
| E' | 2 | 3 |
| F' | 3 | 3 |

FIG.15

| PATTERN | CONTROL SWITCH | | | | |
| --- | --- | --- | --- | --- | --- |
| | 1206 | 1207 | 1208 | 1209 | 1210 |
| A' | ON | ON | ON | ON | SECOND ENHANCEMENT LAYER SIDE ON |
| B' | ON | ON | ON | OFF | SECOND ENHANCEMENT LAYER SIDE ON |
| C' | ON | OFF | ON | OFF | SECOND ENHANCEMENT LAYER SIDE ON |
| D' | ON | ON | OFF | OFF | FIRST ENHANCEMENT LAYER SIDE ON |
| E' | ON | OFF | OFF | OFF | FIRST ENHANCEMENT LAYER SIDE ON |
| F' | OFF | OFF | OFF | OFF | BASE LAYER SIDE ON |

FIG.16

SIGNAL DECODING APPARATUS AND SIGNAL DECODING METHOD

This is a continuation application of application Ser. No. 10/585,313 filed Jul. 6, 2006, now U.S. Pat. No. 7,411,522, which is a 35 USC 371 national phase of PCT/JP2004/019016 filed Dec. 20, 2004, which is based on Japanese Patent Application No. 2004-003402, filed Jan. 8, 2004 and Japanese Patent Application No. 2004-224240, filed Jul. 30, 2004.

TECHNICAL FIELD

The present invention relates to a signal decoding apparatus and signal decoding method used in a communication system where an input signal is scalable-coded and transmitted.

BACKGROUND ART

In the fields of packet communication voice storage typified by digital radio communication and Internet communication, coding/decoding technology for speech signals is indispensable for effective utilization of transmission path capacity for radio waves and recording media, and many speech coding/decoding schemes have been developed so far.

At present, CELP-based speech coding/decoding schemes are used in mainstream (e.g., Non-Patent Document 1). A CELP-based speech coding scheme is designed, primarily, to store models of vocalized sounds and encode input speech based on prestored voice models.

In recent years, in coding of speech signals and audio signals, a scalable coding technology using the CELP scheme is being developed, which is capable of decoding speech/audio sound signals even from part of coded information and minimizing quality deterioration even in the situation where packet loss occurs.

According to a typical example of this scalable coding technology, a method is known whereby an input signal is coded by a coding section of a first layer and coded information is acquired. In addition, for an upper layer, a residual signal, which is the difference between an input signal of a coding section of the (i−1)th layer (i: an integer of two or greater), and a decoded signal of coded information of the (i−1)th layer is used as an input signal for the ith layer, and this signal is coded by a coding section of the ith layer and coded information is acquired, and these processes are repeated.

A decoding apparatus that decodes coded information coded using this method performs decoding in the reverse order of coding.

A decoding apparatus using a conventional scalable coding technology employs a method, whereby, when packet loss occurs (when error is detected) in a layer, a decoded signal of the same layer is processed as an unvoiced signal, or decoding is performed using a decoding result of a packet in at least one of the immediately preceding coded frame and the immediately following coded frame in the same layer (e.g., Patent Document 1).

Patent Document 1: Japanese Patent Application Laid-open No. 2003-241799.

Non-Patent Document 1: M. R. Schroeder, B. S. Atal, "Code Excited Linear Prediction: High Quality Speech at Very Low Bit Rate," IEEE proc., ICASSP'85 pp. 937-940.

DISCLOSURE OF INVENTION

Problems to be Solved by the Invention

However, according to the above described method of Patent Document 1, the scalable coding scheme targeted at differential signals involves the problem that consistency is lost between signals in a layer where transmission error occurs and signals processed in upper layers than that layer, causing noise and quality deterioration.

In view of the above, it is an object of the present invention to provide a signal decoding apparatus and signal decoding method having functions for ensuring that no substantial noise occurs even when transmission error occurs during decoding of scalable-coded information.

Means for Solving the Problem

A signal decoding apparatus according to the present invention decodes coded information formed with n layers, n being an integer of two or greater, and employs a configuration having: a coded information operation section that performs error detection for the coded information per layer; a decoding section that decodes coded information of a layer where no error is detected and generates a decoded signal; a sampling frequency adjustment section that adjusts sampling frequencies of all decoded signals generated, to sampling frequencies in accordance with transmission mode employed upon transmission; and an addition section that adds all the decoded signals with adjusted sampling frequencies.

Furthermore, a signal decoding apparatus according to the present invention decodes coded information formed with n layers, n being an integer of two or greater, and employs a configuration having: a coded information operation section that performs error detection for the coded information per layer; a decoding section that decodes coded information of a layer where no error is detected and generates a decoded signal; a sampling frequency adjustment section that adjusts a sampling frequency of a signal; and an addition section that adds the decoded signal generated in the decoding section and the signal having the sampling frequency adjusted in the sampling frequency adjustment section, and, in this apparatus, the sampling frequency adjustment section adjusts sampling frequencies of a decoded signal of a first layer and a signal in which signals of a second to (n−1)th layers are added in the addition section; and the addition section adds a decoded signal of an ith layer, being an integer not smaller than two and not greater than n, and the signal of the (i−1)th layer with an adjusted sampling frequency.

Advantageous Effect of the Invention

The present invention adjusts the sampling frequencies of decoded signals and adds the adjusted signals into an output signal, thereby ensuring that no substantial noise occurs and decoding high quality speech and audio signals even when transmission error occurs.

BRIEF DESCRIPTION OF DRAWINGS

FIG. 7 illustrates a table stored in a coded information operation section of the signal decoding apparatus according to Embodiment 1 of the present invention;

FIG. 8 illustrates a table stored in a decoding operation control section of the signal decoding apparatus according to Embodiment 1 of the present invention;

FIG. 13 illustrates a table stored in a coded information operation section of the signal decoding apparatus according to Embodiment 2 of the present invention;

FIG. 14 illustrates a table stored in a decoding operation control section of the signal decoding apparatus according to Embodiment 2 of the present invention;

FIG. 15 illustrates a table stored in the coded information operation section of the signal decoding apparatus when the number of layers of coded information changes in a relay station according to Embodiment 2 of the present invention;

FIG. 16 illustrates a table stored in the decoding operation control section of the signal decoding apparatus when the number of layers of coded information changes in the relay station according to Embodiment 2 of the present invention.

BEST MODE FOR CARRYING OUT THE INVENTION

Now, embodiments of the present invention will be described in detail with reference to the accompanying drawings. Each embodiment will be explained with reference to a case where CELP type speech coding/decoding is performed using a layered signal coding/decoding method involving three layers. The "layered signal coding method" refers to a method whereby a signal coding method of coding a differential signal from an input signal and output signal in a lower layer and outputting coded information, is implemented several times in upper layers to form a layered structure. In the following explanations, the bottom layer (first layer) will be referred to as a "base layer" and a layer higher than the base layer will be referred to as an "enhancement layer."

Embodiment 1

Figure 1:
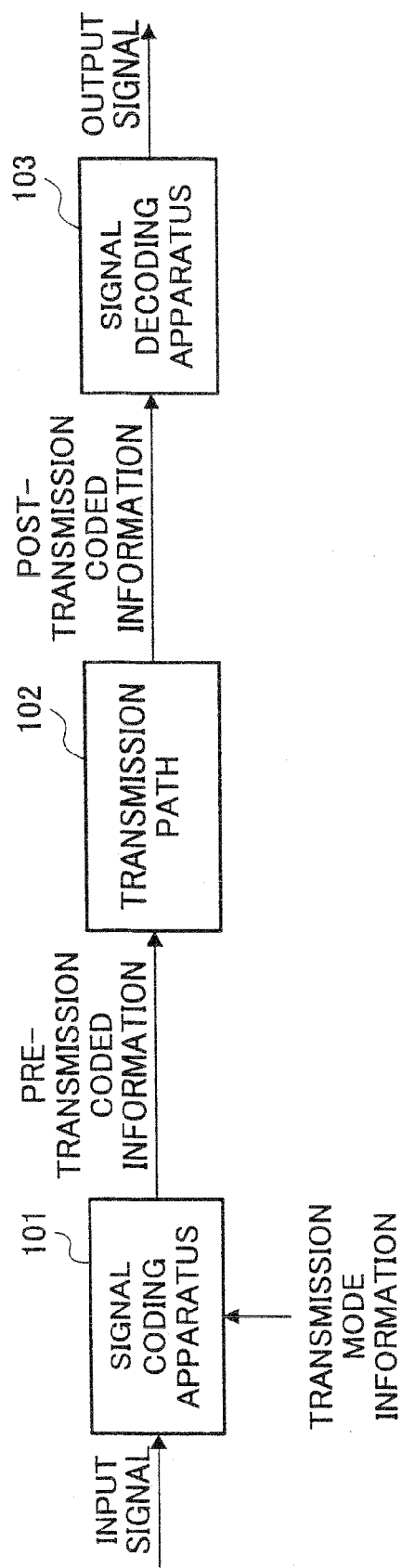
FIG. 1 illustrates a system configuration including a signal decoding apparatus according to Embodiment 1 of the present invention.

FIG. 1 illustrates a system configuration including a signal decoding apparatus according to Embodiment 1 of the present invention.

Signal coding apparatus 101 performs coding of an input signal using a CELP type speech coding method according to transmission mode information and transmits coded information obtained through the coding (hereinafter referred to as "pre-transmission coded information") to signal decoding apparatus 103 through transmission path 102.

Signal decoding apparatus 103 performs decoding of the coded information (hereinafter referred to as "post-transmission coded information") received from signal coding apparatus 101 through transmission path 102 using a CELP type speech decoding method and outputs the decoded signal obtained through the decoding as an output signal. Here, if there is no transmission error in transmission path 102, the pre-transmission coded information and the post-transmission coded information are the same.

Next, the configuration of signal coding apparatus 101 in FIG. 1 will be explained using the block diagram in FIG. 2. Signal coding apparatus 101 divides an input signal per N samples (where N is a natural number) and performs coding per frame, N samples being one frame.

Signal coding apparatus 101 is mainly comprised of transmission bit rate control section 201, control switches 202 to 205, down-sampling processing sections 206 and 211, base layer coding section 207, base layer decoding section 208, up-sampling processing sections 209, 214, addition sections 210, 215, first enhancement layer coding section 212, first enhancement layer decoding section 213, second enhancement layer coding section 216, transmission error detection bit addition section 217 and coded information integration section 218.

Transmission mode information is input in transmission bit rate control section 201. Here, the "transmission mode information" refers to information indicating the transmission bit rate when the input signal is coded and transmitted, and one of two or more predetermined transmission bit rates is selected as transmission mode information. Transmission mode information in this embodiment can take values of three types of predetermined transmission bit rates, namely bitrate 1, bitrate 2 and bitrate 3 (bitrate 3<bitrate 2<bitrate 1).

Transmission bit rate control section 201 performs ON/OFF control of switches 202 to 205 according to the transmission mode information input. More specifically, when the transmission mode information is bitrate 1, transmission bit rate control section 201 sets all control switches 202 to 205 to ON state. Furthermore, when transmission mode information is bitrate 2, transmission bit rate control section 201 sets control switches 202 and 203 to ON state and sets control switches 204 and 205 to OFF state. Furthermore, when transmission mode information is bitrate 3, transmission bit rate control section 201 sets all control switches 202 to 205 to OFF state. Furthermore, transmission bit rate control section 201 outputs transmission mode information to transmission error detection bit addition section 217. In this way, transmission bit rate control section 201 performs ON/OFF control of the control switches according to transmission mode information and thereby determines the combination of coding sections used for coding of input signals.

The input signal is input to control switch 202 and down-sampling processing section 206. Hereinafter, the sampling frequency of an input signal will be referred to as "input sampling frequency."

Down-sampling processing section 206 down-samples the input signal and outputs the signal to base layer coding section 207. Hereinafter, the sampling frequency after down-sampling by down-sampling processing section 206 will be referred to as "base layer sampling frequency."

Base layer coding section 207 performs coding of the output signal of down-sampling processing section 206 using a CELP type speech coding method, and outputs coded information obtained through the coding (hereinafter referred to as "base layer coded information") to transmission error detection bit addition section 217 and control switch 203. The internal configuration of base layer coding section 207 will be described later.

When control switch 203 is in ON state, base layer decoding section 208 performs decoding of the base layer coded information output from base layer coding section 207 using a CELP type speech decoding method and outputs the decoded signal obtained through the decoding (hereinafter referred to as "base layer decoded signal") to up-sampling processing section 209. When control switch 203 is in OFF state, base layer decoding section 208 performs no operation. The internal configuration of base layer decoding section 208 will be described later.

When control switch 203 is in ON state, up-sampling processing section 209 up-samples the base layer decoded signal output from base layer decoding section 208 to the input sampling frequency, and outputs the up-sampled signal to addition section 210. When control switch 203 is in OFF state, up-sampling processing section 209 performs no operation.

When control switches 202 and 203 are in ON state, addition section 210 adds the signal obtained by inverting the polarity of the output signal of up-sampling processing section 209 to the input signal, and outputs a first differential signal, which is the addition result, to down-sampling processing section 211 and control switch 204. When control switches 202 and 203 are in OFF state, addition section 210 performs no operation.

When control switches 202 and 203 are in ON state, down-sampling processing section 211 down-samples the sampling frequency of the first differential signal output from addition section 210, and outputs the first differential signal after the down-sampling to first enhancement layer coding section 212. Hereinafter, the sampling frequency after the down-sampling at down-sampling processing section 211 will be referred to as "first enhancement layer sampling frequency." When control switches 202 and 203 are in OFF state, down-sampling processing section 211 performs no operation.

When control switches 202 and 203 are in ON state, first enhancement layer coding section 212 performs coding of the output signal of down-sampling processing section 211 using a CELP type speech coding method, and outputs coded information obtained through the coding (hereinafter referred to as "first enhancement layer coded information") to control switch 205 and transmission error detection bit addition section 217. When control switches 202 and 203 are in OFF state, first enhancement layer coding section 212 performs no operation.

When control switch 205 is in ON state, first enhancement layer decoding section 213 performs decoding of the first enhancement layer coded information output from first enhancement layer coding section 212 using a CELP type speech decoding method and outputs the decoded signal obtained through the decoding (hereinafter referred to as "first enhancement layer decoded signal") to up-sampling processing section 214. When control switch 205 is in OFF state, first enhancement layer decoding section 213 performs no operation.

When control switch 205 is in ON state, up-sampling processing section 214 up-samples the first enhancement layer decoded signal output from first enhancement layer decoding section 213 to the input sampling frequency, and outputs the up-sampled signal to addition section 215. When control switch 205 is in OFF state, up-sampling processing section 214 performs no operation.

When control switches 204 and 205 are in ON state, addition section 215 adds the signal obtained by inverting the polarity of the output signal of up-sampling processing section 214 to the input signal, and outputs a second differential signal which is the addition result, to second enhancement layer coding section 216. When control switches 204 and 205 are in OFF state, addition section 215 performs no operation.

When control switches 204 and 205 are in ON state, second enhancement layer coding section 216 performs coding of the second differential signal output from addition section 215 using a CELP type speech coding method, and outputs coded information obtained through the coding (hereinafter referred to as "second enhancement layer coded information") to transmission error detection bit addition section 217. When control switches 204 and 205 are in OFF state, second enhancement layer coding section 216 performs no operation.

Transmission error detection bit addition section 217 receives as input the transmission mode information from transmission bit rate control section 201, calculates transmission error detection bits using the transmission mode information, adds the transmission error detection bits to the transmission mode information and outputs the transmission mode information to coded information integration section 218. Furthermore, transmission error detection bit addition section 217 receives as input the base layer coded information from base layer coding section 207, calculates transmission error detection bits using the base layer coded information, adds the transmission error detection bits to the base layer coded information and outputs the base layer code information to coded information integration section 218. Furthermore, when the transmission mode information is bitrate 1 or bitrate 2, transmission error detection bit addition section 217 receives as input the first enhancement layer coded information from first enhancement layer coding section 212, calculates transmission error detection bits using the first enhancement layer coded information, adds the transmission error detection bits to the first enhancement layer coded information and outputs the first enhancement layer coded information to coded information integration section 218. Furthermore, when the transmission mode information is bitrate 1, transmission error detection bit addition section 217 receives as input the second enhancement layer coded information from second enhancement layer coding section 216, calculates transmission error detection bits using the second enhancement layer coded information, adds the transmission error detection bits to the second enhancement layer coded information and outputs the second enhancement layer coded information to coded information integration section 218.

Coded information integration section 218 integrates the coded information and the transmission mode information output from transmission error detection bit addition section 217, and outputs the result as pre-transmission coded information, to transmission path 102.

This is the explanation of the configuration of signal coding apparatus 101 according to Embodiment 1.

Next, the internal configuration of base layer coding section 207 in FIG. 2 will be explained using FIG. 3. Here, a case where base layer coding section 207 performs CELP type speech coding will be explained.

Pre-processing section 301 performs high-pass filtering processing to remove DC component, waveform shaping processing and pre-emphasis processing leading to improved performance of subsequent coding processing, for the signal of the input sampling frequency output from down-sampling processing section 206, and outputs the signal (Xin) after the processing to LPC analysis section 302 and addition section 305.

LPC analysis section 302 performs a linear predictive analysis using Xin and outputs the analysis result (linear predictive coefficient) to LPC quantization section 303. LPC quantization section 303 performs quantization processing of the linear predictive coefficient (LPC) output from LPC analysis section 302, outputs the quantized LPC to synthesis filter 304 and also outputs a code (L) indicating the quantized LPC to multiplexing section 314.

Synthesis filter 304 performs filter synthesis of an excitation output from addition section 311, which will be described later, using filter coefficients based on the quantized LPC to thereby generate a synthesized signal and outputs the synthesized signal to addition section 305.

Addition section 305 inverts the polarity of the synthesized signal and adds the signal to Xin to thereby calculate an error signal and outputs the error signal to auditory weighting section 312.

Adaptive excitation codebook 306 stores excitation output in the past from addition section 311 in a buffer, extracts samples over one frame from past excitation specified by a signal output from parameter determining section 313 as adaptive excitation and outputs them to multiplication section 309.

Quantization gain generation section 307 outputs a quantization adaptive excitation gain and a quantization fixed excitation gain which are specified by signals output from parameter determining section 313 to multiplication section 309 and multiplication section 310, respectively.

Fixed excitation codebook 308 outputs a fixed excitation obtained by multiplying a pulse excitation having a shape specified by the signal output from parameter determining section 313 by a spreading vector, to multiplication section 310.

Multiplication section 309 multiplies the adaptive excitation output from adaptive excitation codebook 306 by the quantization adaptive excitation gain output from quantization gain generation section 307 and outputs the result to addition section 311. Multiplication section 310 multiplies the fixed excitation output from fixed excitation codebook 308 by the quantization fixed excitation gain output from quantization gain generation section 307 and outputs the result to addition section 311.

Addition section 311 receives as input the adaptive excitation and fixed excitation after the gain multiplication from multiplication section 309 and multiplication section 310, respectively, adds these vectors and outputs an excitation, which is the addition result, to synthesis filter 304 and adaptive excitation codebook 306. The excitation input in adaptive excitation codebook 306 is stored in the buffer.

Auditory weighting section 312 performs auditory weighting of the error signal output from addition section 305 and outputs the weighted error signal as coding distortion, to parameter determining section 313.

Parameter determining section 313 selects an adaptive excitation, fixed excitation and quantization gain that minimize the coding distortion output from auditory weighting section 312 from adaptive excitation codebook 306, fixed excitation codebook 308 and quantization gain generation section 307, respectively, and outputs adaptive excitation code (A), fixed excitation code (F) and excitation gain code (G), indicating the selection results, to multiplexing section 314.

Multiplexing section 314 receives as input code (L) indicating the quantized LPC from LPC quantization section 303, receives as input code (A) indicating the adaptive excitation, code (F) indicating the fixed excitation and code (G) indicating the quantization gain from parameter determining section 313, multiplexes these information and outputs the result as base layer coded information.

This is the explanation of the internal configuration of base layer coding section 207 according to Embodiment 1.

Figure 2:
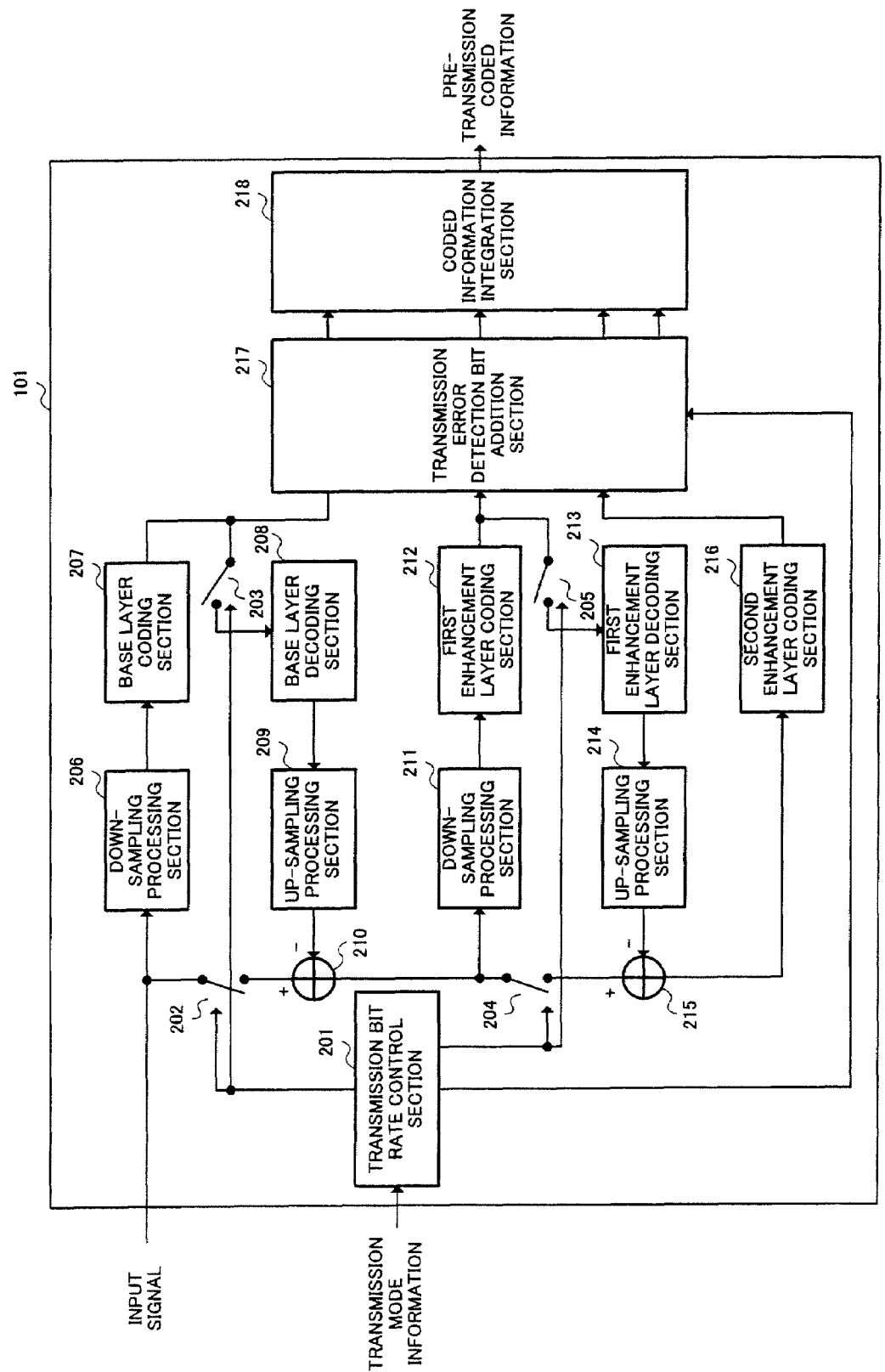
FIG. 2 is a block diagram showing an internal configuration of a signal coding apparatus that sends coded information to the signal decoding apparatus according to Embodiment 1 of the present invention.

The internal configurations of first enhancement layer coding section 212 and second enhancement layer coding section 216 in FIG. 2 are the same as that of base layer coding section 207 and they are only different in the type of signals input, sampling frequency of signals input and type of coded information output, and therefore explanations thereof will be omitted.

Next, the internal configuration of base layer decoding section 208 in FIG. 2 will be explained using FIG. 4. Here, a case where base layer decoding section 207 performs CELP type speech decoding will be explained.

Figure 4:
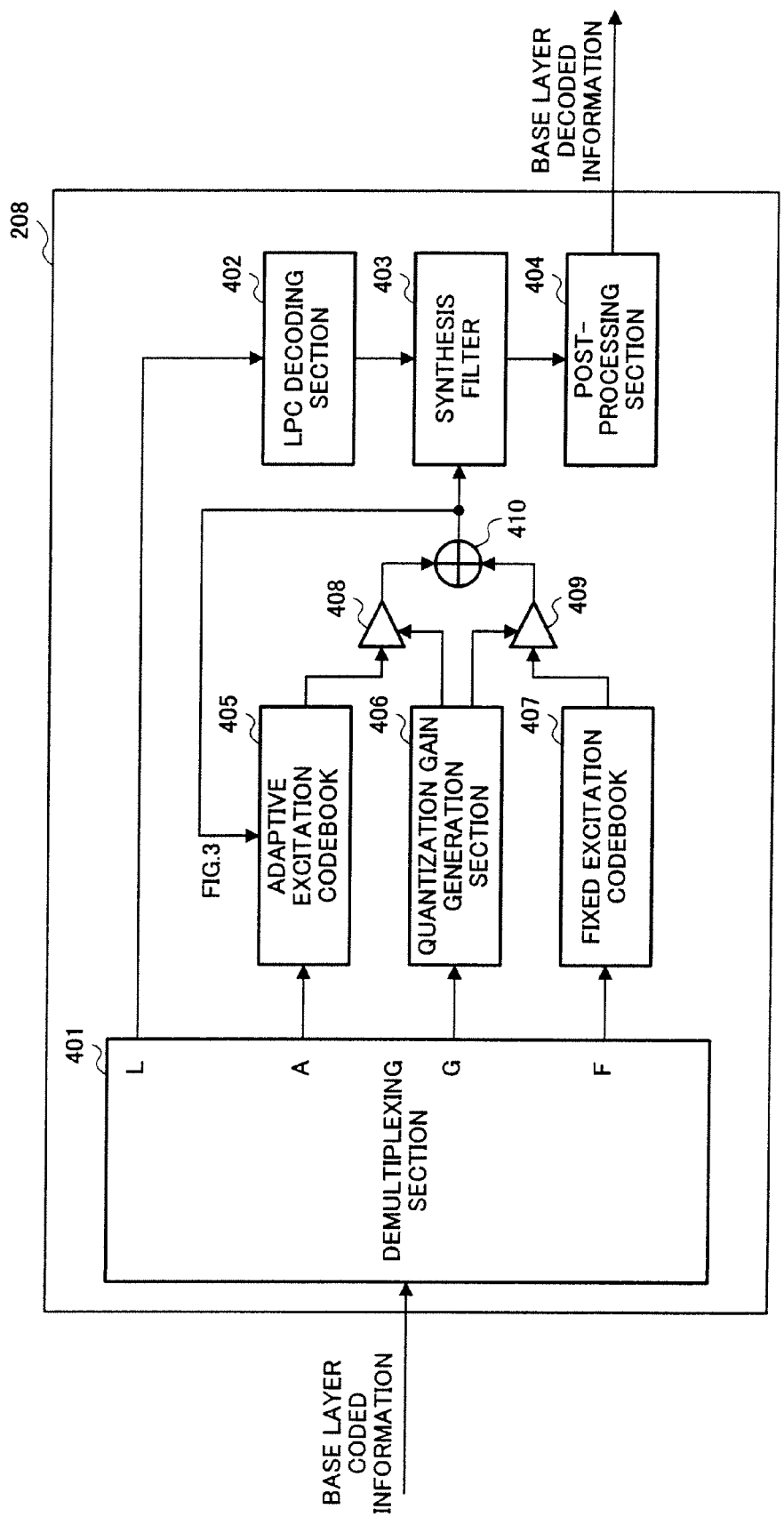
FIG. 4 is a block diagram showing an internal configuration of a base layer decoding section of the signal coding apparatus in FIG. 2.

In FIG. 4, base layer coded information input in base layer decoding section 208 is demultiplexed by demultiplexing section 401 into separate codes (L, A, G, F). Demultiplexed LPC code (L) is output to LPC decoding section 402. Demultiplexed adaptive excitation code (A) is output to adaptive excitation codebook 405. Demultiplexed excitation gain code (G) is output to quantization gain generation section 406 and demultiplexed fixed excitation code (F) is output to fixed excitation codebook 407.

LPC decoding section 402 decodes the quantized LPC from code (L) output from demultiplexing section 401, and outputs the result to synthesis filter 403.

Adaptive excitation codebook 405 extracts samples over one frame from past excitation specified by code (A) output from demultiplexing section 401 as adaptive excitation and outputs them to multiplication section 408.

Quantization gain generation section 406 decodes the quantization adaptive excitation gain and quantization fixed excitation gain specified by excitation gain code (G) output from demultiplexing section 401, and outputs the results to multiplication section 408 and multiplication section 409.

Fixed excitation codebook 407 generates a fixed excitation specified by code (F) output from demultiplexing section 401 and outputs the fixed excitation to multiplication section 409.

Multiplication section 408 multiplies the adaptive excitation by the quantization adaptive excitation gain and outputs the result to addition section 410. Multiplication section 409 multiplies the fixed excitation by the quantization fixed excitation gain and outputs the result to addition section 410.

Addition section 410 adds up the adaptive excitation and fixed excitation after the gain multiplications output from multiplication sections 408 and 409, generates an excitation and outputs this to synthesis filter 403 and adaptive excitation codebook 405.

Synthesis filter 403 performs filter synthesis of the excitation output from addition section 410 using filter coefficients decoded by LPC decoding section 402, and outputs the synthesized signal to post-processing section 404.

Post-processing section 404 applies processing for improving subjective quality of speech such as formant emphasis and pitch emphasis and processing for improving subjective quality of constant noise, to the signal output from synthesis filter 403, and outputs the result as base layer decoded information.

This is the explanation of the internal configuration of base layer decoding section 208 according to Embodiment 1.

The internal configuration of first enhancement layer decoding section 213 in FIG. 2 is the same as the internal configuration of base layer decoding section 208 and they are only different in the type of signals input, sampling frequency of signals input and type of coded information output, and therefore explanations thereof will be omitted.

Next, an example of the method of calculating transmission error detection bits, which transmission error detection bit addition section 217 adds to base layer coded information, will be explained. In this example, the number of bits of base layer coded information is C, and a CRC (Cyclic Redundancy Check) code of ten bits will be used as transmission error detection bits.

Base layer coded information P[i] is expressed as shown in Equation (1) below, where base layer coded information P[i] takes one of values "0" and "1."

$$P[i] = \begin{cases} 0 \\ 1 \end{cases} (i = 0, \ldots, C-1) \quad \text{[Equation 1]}$$

Furthermore, CRC generating polynomial $g_{crc}(x)$ is expressed by Equation (2) below.

$$g_{crc}(x) = 1 + x + x^4 + x^5 + x^9 + x^{10} \quad \text{[Equation 2]}$$

Transmission error detection bit addition section 217 calculates remainder R(x) from Equation (3). Here, Q(x) in Equation (3) is the quotient when P[i] is divided by generating polynomial $g_{crc}(x)$.

$$x^{10} \cdot \sum_{i=0}^{C-1} P[i] \cdot x^i = Q(x) \cdot g_{crc}(x) + R(x) \quad \text{[Equation 3]}$$

Then, CRC code CRC[x] of 10 bits is calculated by Equation (4) below using remainder R(x).

$$R(x) = \sum_{i=0}^{9} CRC[i] \cdot x^i \quad \text{[Equation 4]}$$

Transmission error detection bit addition section 217 calculates transmission error detection bits using the same method for the first enhancement layer coded information, second enhancement layer coded information and transmission mode information.

Figure 5:
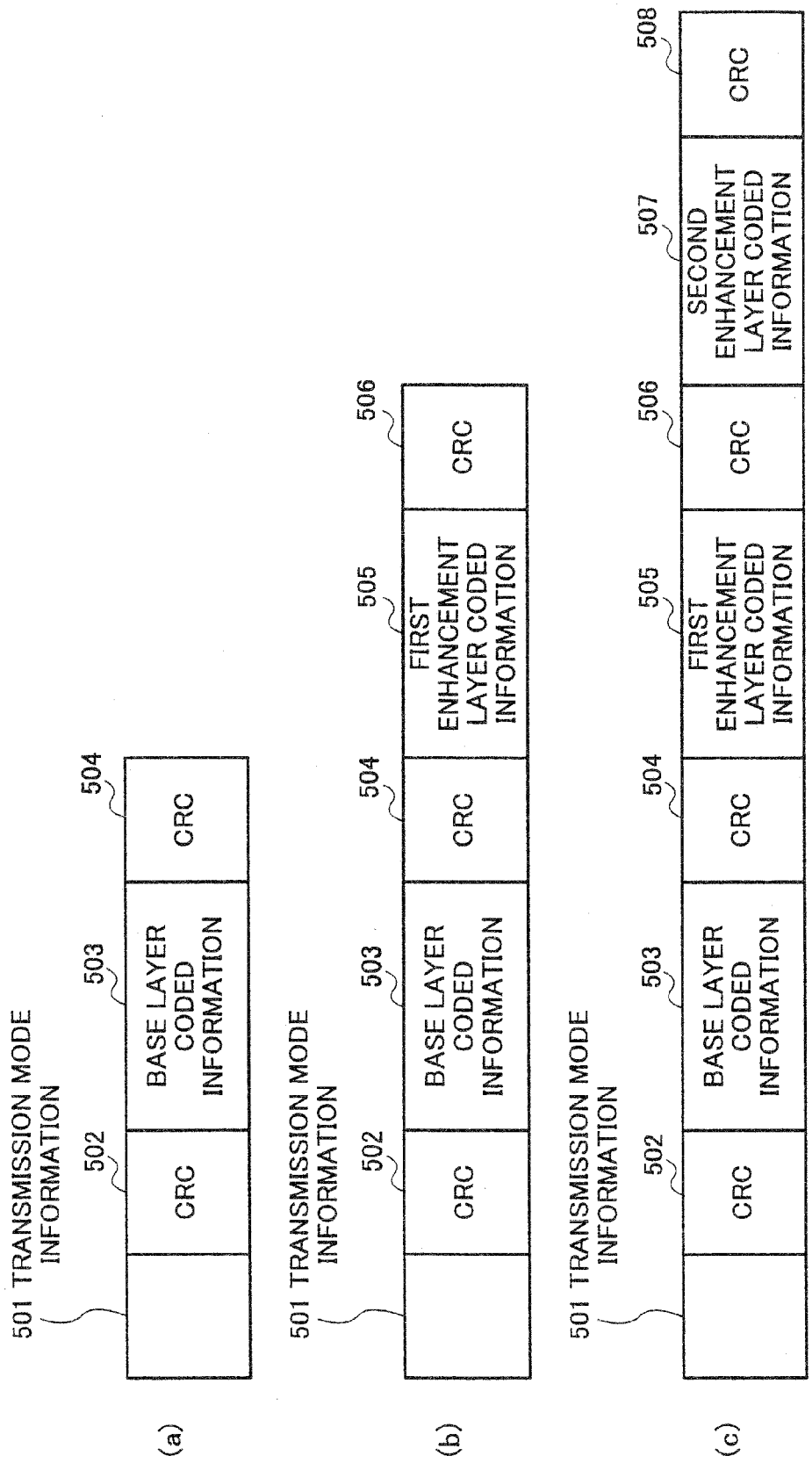
FIG. 5 is a data structure diagram of coded information according to Embodiment 1 of the present invention.

Next, the data structure (bit stream) of pre-transmission coded information will be explained using FIG. 5.

When transmission mode information is bitrate 3, as shown in FIG. 5(a), pre-transmission coded information is comprised of transmission mode information 501, transmission error detection bits 502 added to the transmission mode information, base layer coded information 503 and transmission error detection bits 504 added to the base layer coded information.

Furthermore, when transmission mode information is bitrate 2, as shown in FIG. 5(b), pre-transmission coded information is comprised of transmission mode information 501, transmission error detection bits 502 added to the transmission mode information, base layer coded information 503, transmission error detection bits 504 added to the base layer coded information, first enhancement layer coded information 505 and transmission error detection bits 506 added to the first enhancement layer coded information.

Furthermore, when transmission mode information is bitrate 1, as shown in FIG. 5(c), pre-transmission coded information is comprised of transmission mode information 501, transmission error detection bit 502 added to the transmission mode information, base layer coded information 503, transmission error detection bit 504 added to the base layer coded information, first enhancement layer coded information 505, transmission error detection bit 506 added to the first enhancement layer coded information, second enhancement layer coded information 507 and transmission error detection bit 508 added to the second enhancement layer coded information.

Next, the configuration of signal decoding apparatus 103 in FIG. 1 will be explained using FIG. 6.

Signal decoding apparatus 103 is mainly comprised of coded information operation section 601, decoding operation control section 602, base layer decoding section 603, first enhancement layer decoding section 604, second enhancement layer decoding section 605, control switches 606 and 607 and sampling frequency adjustment sections 608 and 609.

Coded information operation section 601 demultiplexes the transmission mode information, base layer coded information, first enhancement layer coded information, second enhancement layer coded information and their respective transmission error detection bits included in received post-transmission coded information, and performs error detection for the base layer coded information, first enhancement layer coded information and second enhancement layer coded information according to predetermined procedures using the transmission error detection bits. Only when no error is detected in the respective information, coded information operation section 601 outputs the base layer coded information to base layer decoding section 603, outputs the first enhancement layer coded information to first enhancement layer decoding section 604 and outputs the second enhancement layer coded information to second enhancement layer decoding section 605. The error detection procedures and transmission error detection method in coded information operation section 601 will be described later.

Furthermore, coded information operation section 601 stores the table shown in FIG. 7 and outputs information indicating the transmission mode information and a pattern corresponding to the error detection result (hereinafter referred to as "pattern information"), to decoding operation control section 602. Here, in FIG. 7, for each information, "1" is a case where error is detected, "0" is a case where no error is detected, and "-" is a case where no error detection processing is performed. For example, in FIG. 7, when transmission mode information is bitrate 1, no error is detected in the base layer coded information and first enhancement layer coded information and error is detected in the second enhancement layer coded information, coded information operation section 601 outputs pattern information "B" to decoding operation control section 602.

Decoding operation control section 602 stores the table diagram shown in FIG. 8 and performs ON/OFF control of switches 606 and 607 according to the pattern information output from coded information operation section 601. With regard to the operation of the control switch group, in FIG. 8, "ON" indicates control to "ON state" and "OFF" indicates control to "OFF state."

Furthermore, decoding operation control section 602 controls the sampling frequencies of output signals at sampling frequency adjustment sections 608 and 609. With regard to the sampling frequencies, in FIG. 8, $SR_{input}$ is an input sampling frequency and $SR_{enh1}$ is a first enhancement layer sampling frequency.

Furthermore, detects whether or not to perform decoding processing reusing codes used in earlier decoding (LPC code, adaptive excitation code, fixed excitation code, excitation gain code) according to the pattern information (hereinafter referred to as "frame loss compensation processing"). Decoding operation control section 602 outputs information indicating the detection result (hereinafter referred to as "frame loss compensation information") to base layer decoding section 603, first enhancement layer decoding section 604 and second enhancement layer decoding section 605. In FIG. 8, when the value of frame loss compensation information is "0," this means that frame loss compensation processing is not performed in the decoding section. When the value is "1," this means that frame loss compensation processing is performed in the decoding section.

Base layer decoding section 603 decodes the base layer coded information output from coded information operation section 601 and generates a base layer decoded signal. On the other hand, when the frame loss compensation information output from decoding operation control section 602 is "1," error is detected in the base layer coded information. Furthermore, when no base layer coded information is output from coded information operation section 601, base layer decoding section 603 performs frame loss compensation processing and generates a base layer decoded signal. Then, base layer decoding section 603 outputs the base layer decoded signal to sampling frequency adjustment section 608. The internal configuration of base layer decoding section 603 will be described later.

First enhancement layer decoding section 604 decodes the first enhancement layer coded information output from coded information operation section 601 and generates a first enhancement layer decoded signal. Furthermore, when the frame loss compensation information output from decoding operation control section 602 is "1," first enhancement layer decoding section 604 performs frame loss compensation processing and generates a first enhancement layer decoded signal. Then, first enhancement layer decoding section 604 outputs the first enhancement layer decoded signal to sampling frequency adjustment section 609. When the first enhancement layer coded information is not output from coded information operation section 601 and the frame loss compensation information for the first enhancement layer output from decoding operation control section 602 is "0," first enhancement layer decoding section 604 performs no operation.

Second enhancement layer decoding section 605 decodes second enhancement layer coded information output from coded information operation section 601 and generates a second enhancement layer decoded signal. Furthermore, when the frame loss compensation information for the second enhancement layer output from decoding operation control section 602 is "1," second enhancement layer decoding section 605 performs frame loss compensation processing and generates a second enhancement layer decoded signal. Then, second enhancement layer decoding section 605 outputs second enhancement layer decoded signal to control switch 607. When the second enhancement layer coded information is not output from coded information operation section 601 and the frame loss compensation information for the second enhancement layer output from decoding operation control section 602 is "0," second enhancement layer decoding section 605 performs no operation.

Sampling frequency adjustment section 608 adjusts the sampling frequency of the base layer decoded signal output from base layer decoding section 603 based on control of decoding operation control section 602.

Sampling frequency adjustment section 609 adjusts the sampling frequency of the first enhancement layer decoded signal output from first enhancement layer decoding section 604 based on control of decoding operation control section 602.

When control switches 606 and 607 are on, addition section 610 adds the second enhancement layer decoded signal output from second enhancement layer decoding section 605 and the first enhancement layer decoded signal output from sampling frequency adjustment section 609, and outputs the signal after the addition to addition section 611. Furthermore, when control switch 607 is off and control switch 606 is on, addition section 610 outputs the first enhancement layer decoded signal output from sampling frequency adjustment section 609 to addition section 611. When control switches 606 and 607 are off, addition section 610 performs no operation.

Addition section 611 adds the base layer decoded signal output from sampling frequency adjustment section 608 and the output signal of addition section 610, and outputs the signal after the addition as an output signal. Furthermore, when control switches 606 and 607 are off, addition section 611 outputs the base layer decoded signal output from sampling frequency adjustment section 608 as an output signal.

This is the explanation of signal decoding apparatus 103 according to Embodiment 1.

Next, the error detection procedure in coded information operation section 601 will be explained using a flow chart in FIG. 9.

First, coded information operation section 601 carries out error detection for the base layer coded information using the transmission error detection bits (S901).

When error is detected as a result of S901 (S902: Yes), coded information operation section 601 outputs pattern information "I" when the transmission mode information is bitrate 3, pattern information "G" when the transmission mode information is bitrate 2, and pattern information "D" when the transmission mode information is bitrate 1, to decoding operation control section 602, and finishes the error detection processing (S903 to S907).

On the other hand, when no error is detected as a result of S901 (S902: No), coded information operation section 601 outputs the base layer coded information to base layer decoding section 603 (S908).

Then, when the transmission mode information is bitrate 3 (S909: Yes), coded information operation section 601 outputs pattern information "H" to decoding operation control section 602 and finishes the error detection processing (S910).

On the other hand, when the transmission mode information is hot bitrate 3 (S909: No), coded information operation section 601 performs error detection for the first enhancement layer coded information using the transmission error detection bits (S911).

When error is detected as a result of S911 (S912: Yes), coded information operation section 601 outputs pattern information "F" when the transmission mode information is bitrate 2, and pattern information "C" when the transmission mode information is bitrate 1, to decoding operation control section 602, and finishes the error detection processing (S913 to S915).

On the other hand, when no error is detected as a result of S911 (S912: No), coded information operation section 601 outputs the first enhancement layer coded information to first enhancement layer decoding section 604 (S916).

When the transmission mode information is bitrate 2 (S917: Yes), coded information operation section 601 outputs pattern information "E" to decoding operation control section 602 and finishes the error detection processing (S918).

On the other hand, when the transmission mode information is bitrate 1 (S917: No), coded information operation section 601 performs error detection for the second enhancement layer coded information using the transmission error detection bits (s919).

When error is detected as a result of S919 (S920: Yes), coded information operation section 601 outputs pattern information "B" to decoding operation control section 602 and finishes the error detection processing (S921).

On the other hand, when no error is detected as a result of S919 (S920: No), coded information operation section 601 outputs the second enhancement layer coded information to second enhancement layer decoding section 605 (S922), outputs pattern information "A" to decoding operation control section 602 and finishes the error detection processing (S923).

Next, the transmission error detection method for base layer coded information in coded information operation section 601 will be explained.

Base layer coded information p'[i] is expressed as shown in Equation (5) below. Furthermore, p'[i] takes one of values "0" and "1."

$$P'[i] = \begin{cases} 0 \\ 1 \end{cases} (i = 0, \ldots, C-1) \quad \text{[Equation 5]}$$

Furthermore, CRC generating polynomial $g_{crc}(x)$ is expressed by Equation (6) below.

$$g_{crc}(x) = 1 + x + x^4 + x^5 + x^9 + x^{10} \quad \text{[Equation 6]}$$

Coded information operation section 601 calculates remainder R'(x) from Equation (7) below. Here, Q(x) in Equation (7) is a quotient of division by $g_{crc}(x)$.

$$x^{10} \cdot \sum_{i=0}^{C-1} P'[i] \cdot x^i = Q'(x) \cdot g_{crc}(x) + R'(x) \quad \text{[Equation 7]}$$

Then, CRC code CRC'[x] often bits for transmitted base layer coded information is determined using remainder R'(x) from Equation (8) below.

$$R'(x) = \sum_{i=0}^{9} CRC'[i] \cdot x^i \quad \text{[Equation 8]}$$

Next, coded information operation section 601 compares CRC'[x] with CRC code CRC[x] of transmission error detection bits added to the base layer coded information. When they match, coded information operation section 601 decides that there is no transmission error, and, when they do not match, coded into operation section 601 decides that there is transmission error.

Coded information operation section 601 performs error detection using the same method for the first enhancement layer coded information and second enhancement layer coded information, in addition to base layer coded information.

Next, base layer decoding section 603 in FIG. 6 will be explained using FIG. 10. Here, a case where base layer decoding section 603 performs CELP type speech decoding will be explained.

Figure 10:
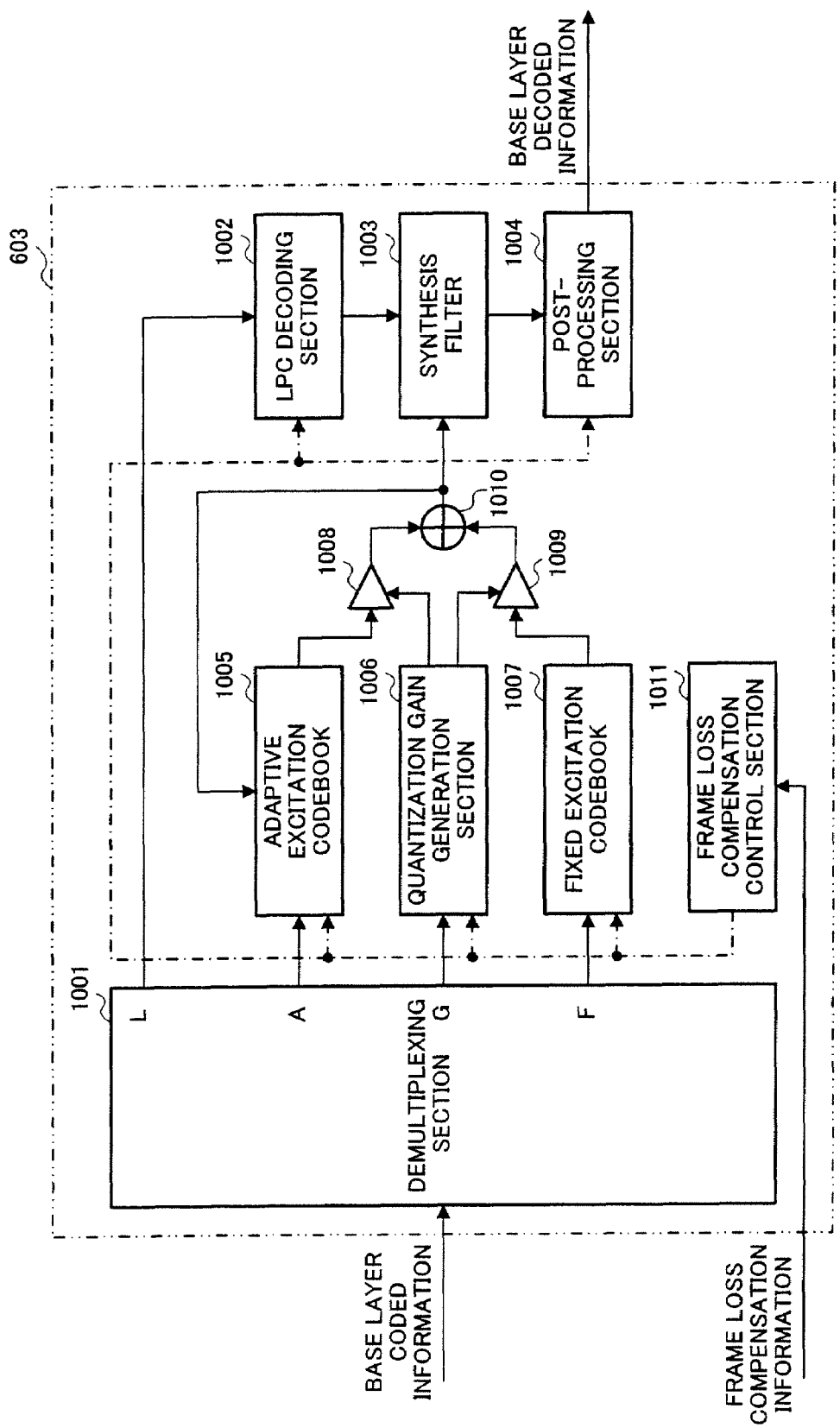
FIG. 10 is a block diagram showing an internal configuration of a base layer decoding section of the signal decoding apparatus in FIG. 2.

In FIG. 10, base layer coded information input to base layer decoding section 603 is demultiplexed into separate codes (L, A, G, F) by demultiplexing section 1001. Demultiplexed LPC code (L) is output to LPC decoding section 1002, and demultiplexed adaptive excitation code (A) is output to adaptive excitation codebook 1005. Furthermore, demultiplexed excitation gain code (G) is output to quantization gain generation section 1006, and demultiplexed fixed excitation code (F) is output to fixed excitation codebook 1007.

LPC decoding section 1002 decodes the quantized LPC from code (L) output from demultiplexing section 1001 and outputs the result to synthesis filter 1003.

Adaptive excitation codebook 1005 extracts samples over one frame from past excitation specified by code (A) output from demultiplexing section 1001 as adaptive excitation, and outputs them to multiplication section 1008.

Quantization gain generation section 1006 decodes the quantization adaptive excitation gain and quantization fixed excitation gain specified by excitation gain code (G) output from demultiplexing section 1001 and outputs them to multiplication section 1008 and multiplication section 1009.

Fixed excitation codebook 1007 generates the fixed excitation specified by code (F) output from demultiplexing section 1001 and outputs the result to multiplication section 1009.

Multiplication section 1008 multiplies the adaptive excitation by the quantization adaptive excitation gain and outputs the result to addition section 1010. Multiplication section 1009 multiplies the fixed excitation by the quantization fixed excitation gain and outputs the result to addition section 1010.

Addition section 1010 adds the adaptive excitation and fixed excitation after gain multiplication output from multiplication sections 1008 and 1009, generates an excitation and outputs this to synthesis filter 1003 and adaptive excitation codebook 1005.

Synthesis filter 1003 performs filter synthesis of the excitation output from addition section 1010 using filter coefficients decoded by LPC decoding section 1002 and outputs a synthesized signal to post-processing section 1004.

Post-processing section 1004 applies processing for improving subjective quality of speech such as formant emphasis and pitch emphasis and processing for improving subjective quality of constant noise to the signal output from synthesis filter 1003, and outputs the result as base layer decoded information.

Frame loss compensation control section 1011 receives as input base layer frame loss compensation information from decoding operation control section 602, and instructs adaptive excitation codebook 1005, quantization gain generation section 1006, fixed excitation codebook 1007, LPC decoding section 1002 and post-processing section 1004, to execute frame loss compensation processing, when the base layer frame loss compensation information "1." Adaptive excitation codebook 1005, quantization gain generation section 1006, fixed excitation codebook 1007, LPC decoding section 1002 and post-processing section 1004, which are instructed by frame loss compensation control section 1011 to perform frame loss compensation processing, perform decoding reusing codes (LPC code, adaptive excitation code, fixed excitation code, excitation gain code) used in earlier decoding and output a base layer decoded signal obtained, to sampling frequency adjustment section 608. In that case, when frame loss compensation processing is performed continuously to reduce noise, processing for gradually decreasing the gain is usually performed. Details of this algorithm are disclosed, for example, in ARIB digital car telephone system standard specifications (RCR STD-27 Version J. 5.3.4.3 pp1138-1139). Furthermore, when the base layer frame loss compensation information is "0," frame loss compensation control section 1011 performs no operation.

This is the explanation of the internal configuration of base layer decoding section 603 according to Embodiment 1.

Figure 6:
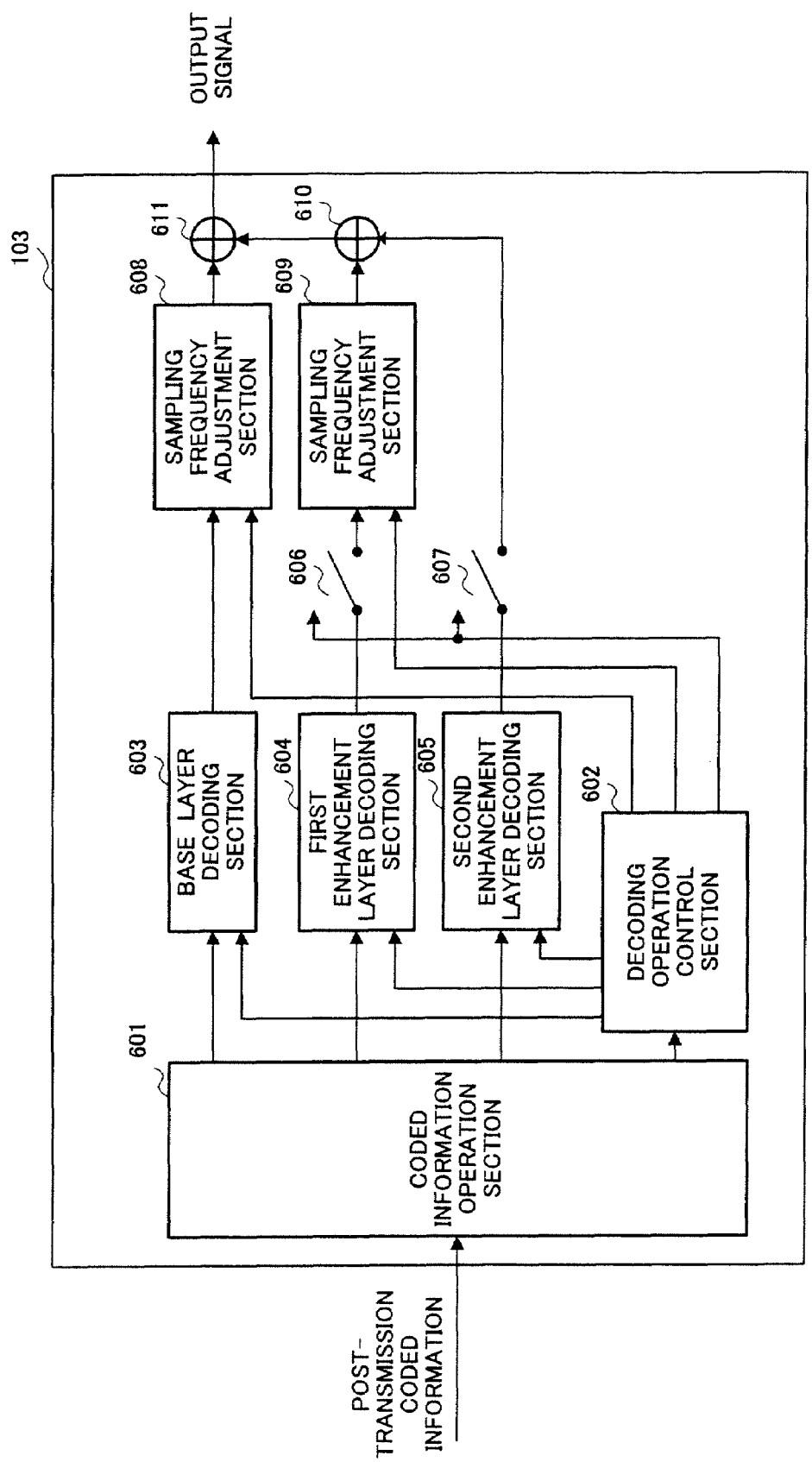
FIG. 6 is a block diagram showing an internal configuration of the signal decoding apparatus according to Embodiment 1 of the present invention.

The internal configurations of first enhancement layer decoding section 604 and second enhancement layer decoding section 605 in FIG. 6 are the same as the internal configuration of base layer decoding section 603 and have been explained above. Furthermore, the configuration of first enhancement layer decoding section 604 replaces the base layer coded information in FIG. 10 with first enhancement layer coded information and replaces the base layer decoded signal in FIG. 10 with a first enhancement layer decoded signal.

Furthermore, the configuration of second enhancement layer decoding section 605 replaces the base layer coded information in FIG. 10 with second enhancement layer coded information and replaces the base layer decoded signal in FIG. 10 with a second enhancement layer decoded signal.

Next, the operation of signal decoding apparatus 103 will be explained for each pattern.

(Pattern A)

First, coded information operation section 601 outputs base layer coded information to base layer decoding section 603, outputs a first enhancement layer decoded signal to first enhancement layer decoding section 604 and outputs a second enhancement layer decoded signal to second enhancement layer decoding section 605.

Furthermore, as shown in FIG. 8, control switches 606 and 607 are set to ON state, and the sampling frequencies of sampling frequency adjustment sections 608 and 609 are set to $SR_{input}$, under control of decoding operation control section 602. Furthermore, decoding operation control section 602 substitutes "0" in all results frame loss compensation information and outputs them.

As a result, base layer decoding section 603 performs decoding processing and outputs a base layer decoded signal, first enhancement layer decoding section 604 performs decoding processing and outputs a first enhancement layer decoded signal and second enhancement layer decoding section 605 performs decoding processing and outputs a second enhancement layer decoded signal.

Furthermore, sampling frequency adjustment section 608 up-samples the base layer decoded signal and sets the sampling frequency at $SR_{input}$, and sampling frequency adjustment section 609 up-samples the first enhancement layer decoded signal and sets the sampling frequency at $SR_{input}$.

Then, a signal adding the base layer decoded signal, first enhancement layer decoded signal and second enhancement layer decoded signal is output as an output signal.

(Pattern B)

First, coded information operation section 601 outputs base layer coded information to base layer decoding section 603 and outputs a first enhancement layer decoded signal to first enhancement layer decoding section 604. Coded information operation section 601 outputs nothing to second enhancement layer decoding section 605.

Furthermore, as shown in FIG. 8, control switch 606 is set in ON state and control switch 607 is set in OFF state and the sampling frequencies of sampling frequency adjustment sections 608 and 609 are set to $SR_{input}$ under control of decoding operation control section 602. Furthermore, decoding operation control section 602 substitutes "0" in all frame loss compensation information and outputs the results.

As a result, base layer decoding section 603 performs decoding processing and outputs a base layer decoded signal, and first enhancement layer decoding section 604 performs decoding processing and outputs a first enhancement layer decoded signal. Second enhancement layer decoding section 605 performs no operation.

Furthermore, sampling frequency adjustment section 608 up-samples the base layer decoded signal and sets the sampling frequency to $SR_{input}$ and sampling frequency adjustment section 609 up-samples the first enhancement layer decoded signal and sets the sampling frequency to $SR_{input}$.

Then, a signal adding the base layer decoded signal and first enhancement layer decoded signal is output as an output signal.

(Pattern C)

First, coded information operation section 601 outputs the base layer coded information to base layer decoding section 603. Coded information operation section 601 outputs nothing to first enhancement layer decoding section 604 and second enhancement layer decoding section 605.

Furthermore, as shown in FIG. 8, control switches 606 and 607 a reset to OFF state, and the sampling frequency of sampling frequency adjustment section 608 is set to $SR_{input}$ under control of decoding operation control section 602. Furthermore, decoding operation control section 602 substitutes "0" in all frame loss compensation information and outputs the results.

As a result, base layer decoding section 603 performs decoding processing and outputs a base layer decoded signal. First enhancement layer decoding section 604 and second enhancement layer decoding section 605 perform no operation.

Furthermore, sampling frequency adjustment section 608 up-samples the base layer decoded signal and sets the sampling frequency to $SR_{input}$. Sampling frequency adjustment section 609 performs no operation.

Then, the base layer decoded signal is output as an output signal.

(Pattern D)

In this case, coded information operation section 601 outputs nothing to base layer decoding section 603, first enhancement layer decoding section 604 and second enhancement layer decoding section 605.

As shown in FIG. 8, control switches 606 and 607 are set to ON state and the sampling frequencies of sampling frequency adjustment sections 608 and 609 are set to $SR_{input}$ under control of decoding operation control section 602. Furthermore, decoding operation control section 602 substitutes "1" in all frame loss compensation information and outputs the results.

As a result, base layer decoding section 603 performs frame loss compensation processing and outputs the base layer decoded signal. First enhancement layer decoding section 604 performs frame loss compensation processing and outputs a first enhancement layer decoded signal. Second enhancement layer decoding section 605 performs frame loss compensation processing and outputs a second enhancement layer decoded signal.

Furthermore, sampling frequency adjustment section 608 up-samples the base layer decoded signal and sets the sampling frequency to $SR_{input}$, and sampling frequency adjustment section 609 upsamples the first enhancement layer decoded signal and sets the sampling frequency to $SR_{input}$.

Then, a signal adding the base layer decoded signal, first enhancement layer decoded signal and second enhancement layer decoded signal is output as an output signal.

(Pattern E)

First, coded information operation section 601 outputs base layer coded information to base layer decoding section 603 and outputs a first enhancement layer decoded signal to first enhancement layer decoding section 604. Coded information operation section 601 outputs nothing to second enhancement layer decoding section 605.

Furthermore, as shown in FIG. 8, control switch 606 is set to ON state, control switch 607 is set to OFF state and the sampling frequencies of sampling frequency adjustment sections 608 and 609 are set to $SR_{enh1}$ under control of decoding operation control section 602. Furthermore, decoding operation control section 602 substitutes "0" in all frame loss compensation information and outputs the results.

As a result, base layer decoding section 603 performs decoding processing and outputs a base layer decoded signal. First enhancement layer decoding section 604 performs decoding processing and outputs a first enhancement layer decoded signal. Second enhancement layer decoding section 605 performs no operation.

Furthermore, sampling frequency adjustment section 608 up-samples the base layer decoded signal and sets the sampling frequency to $SR_{enh1}$. Sampling frequency adjustment section 609 performs no operation.

Then, a signal adding the base layer decoded signal and first enhancement layer decoded signal is output as an output signal.

(Pattern F)

First, coded information operation section 601 outputs base layer coded information to base layer decoding section 603. Coded information operation section 601 outputs nothing to first enhancement layer decoding section 604 and second enhancement layer decoding section 605.

Furthermore, as shown in FIG. 8, control switches 606 and 607 are set to OFF state and the sampling frequency of sampling frequency adjustment section 608 is set to $SR_{enh1}$ under control of decoding operation control section 602. Furthermore, decoding operation control section 602 substitutes "0" in all frame loss compensation information and outputs the results.

As a result, base layer decoding section 603 performs decoding processing and outputs a base layer decoded signal. First enhancement layer decoding section 604 and second enhancement layer decoding section 605 perform no operation.

Furthermore, sampling frequency adjustment section 608 up-samples the base layer decoded signal and sets the sampling frequency to $SR_{enh1}$. Sampling frequency adjustment section 609 performs no operation.

Then, the base layer decoded signal is output as an output signal.

(Pattern G)

In this case, coded information operation section 601 outputs nothing to base layer decoding section 603, first enhancement layer decoding section 604 and second enhancement layer decoding section 605.

Furthermore, as shown in FIG. 8, control switch 606 is set to ON state, control switch 607 is set to OFF state and the sampling frequency of sampling frequency adjustment section 608 is set to $SR_{enh1}$, under control of decoding operation control section 602. Furthermore, decoding operation control section 602 substitutes "1" in the frame loss compensation information for the base layer and first enhancement layer and outputs the results, and substitutes "0" in the frame loss compensation information for the second enhancement layer and outputs the results.

As a result, base layer decoding section 603 performs frame loss compensation processing and outputs a base layer decoded signal. First enhancement layer decoding section 604 performs frame loss compensation processing and outputs a first enhancement layer decoded signal. Second enhancement layer decoding section 605 performs no operation.

Furthermore, sampling frequency adjustment section 608 up-samples the base layer decoded signal and sets the sampling frequency to $SR_{enh1}$. Sampling frequency adjustment section 609 performs no operation.

Then, a signal adding the base layer decoded signal and first enhancement layer decoded signal is output as an output signal.

(Pattern H)

First, coded information operation section 601 outputs base layer coded information to base layer decoding section 603. Coded information operation section 601 outputs nothing to first enhancement layer decoding section 604 and second enhancement layer decoding section 605.

Furthermore, as shown in FIG. 8, control switches 606 and 607 are set to OFF state under control of decoding operation control section 602. Furthermore, decoding operation control section 602 substitutes "0" in all frame loss compensation and outputs the results.

As a result, base layer decoding section 603 performs decoding processing and outputs a base layer decoded signal. First enhancement layer decoding section 604 and second enhancement layer decoding section 605 perform no operation.

Furthermore, sampling frequency adjustment sections 608 and 609 perform no operation.

Then, the base layer decoded signal is output as an output signal.

(Pattern I)

In this case, coded information operation section 601 outputs nothing to base layer decoding section 603, first enhancement layer decoding section 604 and second enhancement layer decoding section 605.

Furthermore, as shown in FIG. 8, control switches 606 and 607 are set to OFF state under control of decoding operation control section 602. Furthermore, decoding operation control section 602 substitutes "1" in the frame loss compensation information for the base layer and outputs the result, and substitutes "0" in the frame loss compensation information for the first enhancement layer and second enhancement layer and outputs the results.

As a result, base layer decoding section 603 performs frame loss compensation processing and outputs a base layer decoded signal. First enhancement layer decoding section 604 and second enhancement layer decoding section 605 perform no operation.

Furthermore, sampling frequency adjustment sections 608 and 609 perform no operation.

Then, the base layer decoded signal is output as an output signal.

Thus, when transmission error occurs in the ith layer (i: an integer of 2 or greater) (pattern B, C and F), this embodiment adjusts the sampling frequencies of decoded signals of the first layer to the (i−1)th layer, adds the adjusted signals and outputs the result as an output signal. Furthermore, when error is detected in the base layer (pattern D, G, I), frame loss compensation processing is performed in all layers coded information is generated, the sampling frequency of each decoded signal obtained through this control is adjusted, and the adjusted signals are added and the result is output as an output signal. By this means, when signals such as scalable-coded speech/audio are decoded, even if transmission error or the like occurs in part of the coded information, it is still possible to ensure guarantee that no substantial noise will be generated.

Embodiment 2

Since the system configuration including a signal decoding apparatus according to Embodiment 2 of the present invention is the same as that of FIG. 1 which has already been explained, explanations thereof will be omitted.

Hereinafter, the configuration of signal coding apparatus 101 according to Embodiment 2 will be explained using the block diagram in FIG. 11. Signal coding apparatus 101 divides an input signal per N samples (N: natural number), and performs coding per frame, N samples being one frame.

Signal coding apparatus 101 is mainly comprised of transmission bit rate control section 1101, control switches 1102 to 1105, down-sampling processing sections 1106 and 1110, base layer coding section 1107, base layer decoding section 1108, up-sampling processing sections 1109 and 1114, addition sections 1111 and 1115, first enhancement layer coding section 1112, first enhancement layer decoding section 1113, second enhancement layer coding section 1116, transmission error detection bit addition section 1117 and coded information integration section 1118.

Transmission mode information in input to transmission bit rate control section 1101. Here, the "transmission mode information" refers to information indicating the transmission bit rate when the input signal is coded and transmitted, and one of two or more predetermined transmission bit rates is selected as transmission mode information. Transmission mode information in this embodiment can take values of three types of predetermined transmission bit rates, namely, bitrate 1, bitrate 2 and bitrate 3 (bitrate 3<bitrate 2<bitrate 1).

Transmission bit rate control section 1101 performs ON/OFF of control switches 1102 to 1105 according to the transmission mode information input. More specifically, when the transmission mode information is bitrate 1, transmission bit rate control section 1101 sets all control switches 1102 to 1105 to ON state. Furthermore, when transmission mode information is bitrate 2, transmission bit rate control section 1101 sets control switches 1102 and 1103 to ON state and sets control switches 1104 and 1105 to OFF state. Furthermore, when the transmission mode information is bitrate 3, transmission bit rate control section 1101 sets all control switches 1102 to 1105 to OFF state. Furthermore, transmission bit rate control section 1101 outputs transmission mode information to transmission error detection bit addition section 1117. In this way, transmission bit rate control section 1101 performs ON/OFF control of the control switches according to transmission mode information and thereby determines the combination of coding sections used for coding of input signals.

The input signal is input to control switch 1102 and down-sampling processing section 1106. Hereinafter, the sampling frequency of input signal will be referred to as "input sampling frequency."

Down-sampling processing section 1106 down-samples the input signal and outputs the signal to base layer coding section 1107. Hereinafter, the sampling frequency after down-sampling by down-sampling processing section 1106 will be referred to as "base layer sampling frequency."

Base layer coding section 1107 performs coding of the output signal of down-sampling processing section 1106 using a CELP type speech coding method, and outputs coded information obtained through the coding (hereinafter referred to as "base layer coded information") to transmission error detection bit addition section 1117 and control switch 1103.

When control switch 1103 is in ON state, base layer decoding section 1108 performs decoding of the base layer coded information output from base layer coding section 1107 using a CELP type speech decoding method and outputs the decoded signal obtained through the decoding (hereinafter referred to as "base layer decoded signal") to up-sampling processing section 1109. When control switch 103 is in OFF state, base layer decoding section 1108 performs no operation.

When control switch 1103 is in ON state, up-sampling processing section 1109 up-samples the base layer decoded signal output from base layer decoding section 1108 and outputs the up-sampled signal to addition section 1111. Hereinafter, the up-sampled sampling frequency of up-sampling processing section 1109 will be referred to as "first enhancement layer sampling frequency." When control switch 1103 is in OFF state, up-sampling processing section 1109 performs no operation.

When control switch 1102 is in ON state, down-sampling processing section 1110 down-samples the input signal to the first enhancement layer sampling frequency and outputs the result to addition section 111.

When control switches 1102 and 1103 are in ON state, addition section 1111 adds the signal obtained by inverting the polarity of the output signal of up-sampling processing section 1109 to the signal obtained from down-sampling processing section 1110, and outputs a first differential signal, which is the addition result, to first enhancement layer coding section 1112. When control switches 1102 and 1103 are in OFF state, addition section 1111 performs no operation.

When control switches 1102 and 1103 are in ON state, first enhancement layer coding section 1112 performs coding of the output signal of addition section 1111 using a CELP type speech coding method and outputs the coded information obtained through the coding (hereinafter referred to as "first enhancement layer coded information") to control switch 1105 and transmission error detection bit addition section 1117. When control switches 1102 and 1103 are in OFF state, first enhancement layer coding section 1112 performs no operation.

When control switch 1105 is in ON state, first enhancement layer decoding section 1113 performs decoding of the first enhancement layer coded information output from first enhancement layer coding section 1112 using a CELP type speech decoding method and outputs the decoded signal obtained through the decoding (hereinafter referred to as "first enhancement layer decoded signal") to up-sampling processing section 1114. When control switch 1105 is in OFF state, first enhancement layer decoding section 1113 performs no operation.

When control switch 1105 is in ON state, up-sampling processing section 1114 up-samples the first enhancement layer decoded signal output from first enhancement layer decoding section 1113 to the input sampling frequency and outputs the up-sampled signal to addition section 1115. When control switch 1105 is in OFF state, up-sampling processing section 1114 performs no operation.

When control switches 1104 and 1105 are in ON state, addition section 1115 adds the signal obtained by inverting the polarity of the output signal of up-sampling processing section 1114 to the input signal, and outputs a second differential signal which is the addition result, to second enhancement layer coding section 1116. When control switches 1104, 1105 are in OFF state, addition section 1115 performs no operation.

When control switches 1104 and 1105 are in ON state, second enhancement layer coding section 1116 performs coding of the second differential signal output from addition section 1115 using a CELP type speech coding method, and outputs the coded information obtained through the coding (hereinafter referred to as "second enhancement layer coded information") to transmission error detection bit addition section 1117. When control switches 1104 and 1105 are in OFF state, second enhancement layer coding section 1116 performs no operation.

Transmission error detection bit addition section 1117 receives as input the transmission mode information from transmission bit rate control section 1101, calculates transmission error detection bits using the transmission mode information, adds the transmission error detection bits to the transmission mode information and outputs the transmission mode information to coded information integration section 1118. Furthermore, transmission error detection bit addition section 1117 receives as input the base layer coded information from base layer coding section 1107, calculates transmission error detection bits using the base layer coded information, adds the transmission error detection bits to the base layer coded information and outputs the base layer coded information to coded information integration section 1118. Furthermore, when the transmission mode information is bitrate 1 or bitrate 2, transmission error detection bit addition section 1117 receives as input the first enhancement layer coded information from first enhancement layer coding section 1112, calculates transmission error detection bits using the first enhancement layer coded information, adds the transmission error detection bits to the first enhancement layer coded information and outputs the first enhanced layer coded information to coded information integration section 1118. Furthermore, when the transmission mode information is bitrate 1, transmission error detection bit addition section 1117 receives as input the second enhancement layer coded information from second enhancement layer coding section 1116, calculates transmission error detection bits using the second enhancement layer coded information, adds the transmission error detection bits to the second enhancement layer coded information and outputs the second enhanced layer coded information to coded information integration section 1118.

Coded information integration section 1118 integrates the coded information and the transmission mode information output from transmission error detection bit addition section 1117, and outputs the result as pre-transmission coded information, to transmission path 102.

This is the explanation of the configuration of signal coding apparatus 101 according to Embodiment 2.

Figure 3:
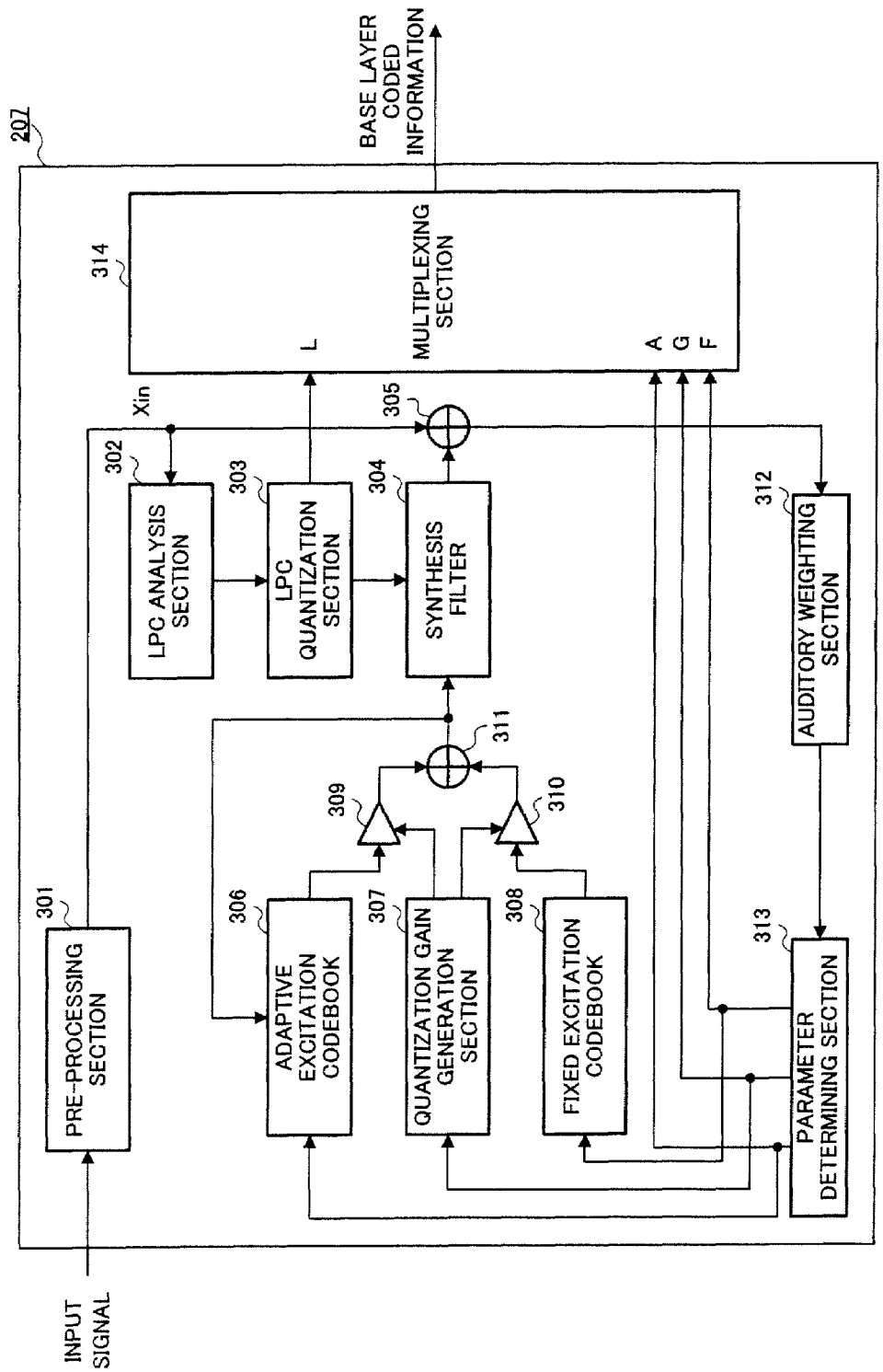
FIG. 3 is a block diagram showing an internal configuration of a base layer coding section of the signal coding apparatus in FIG. 2.
Figure 11:
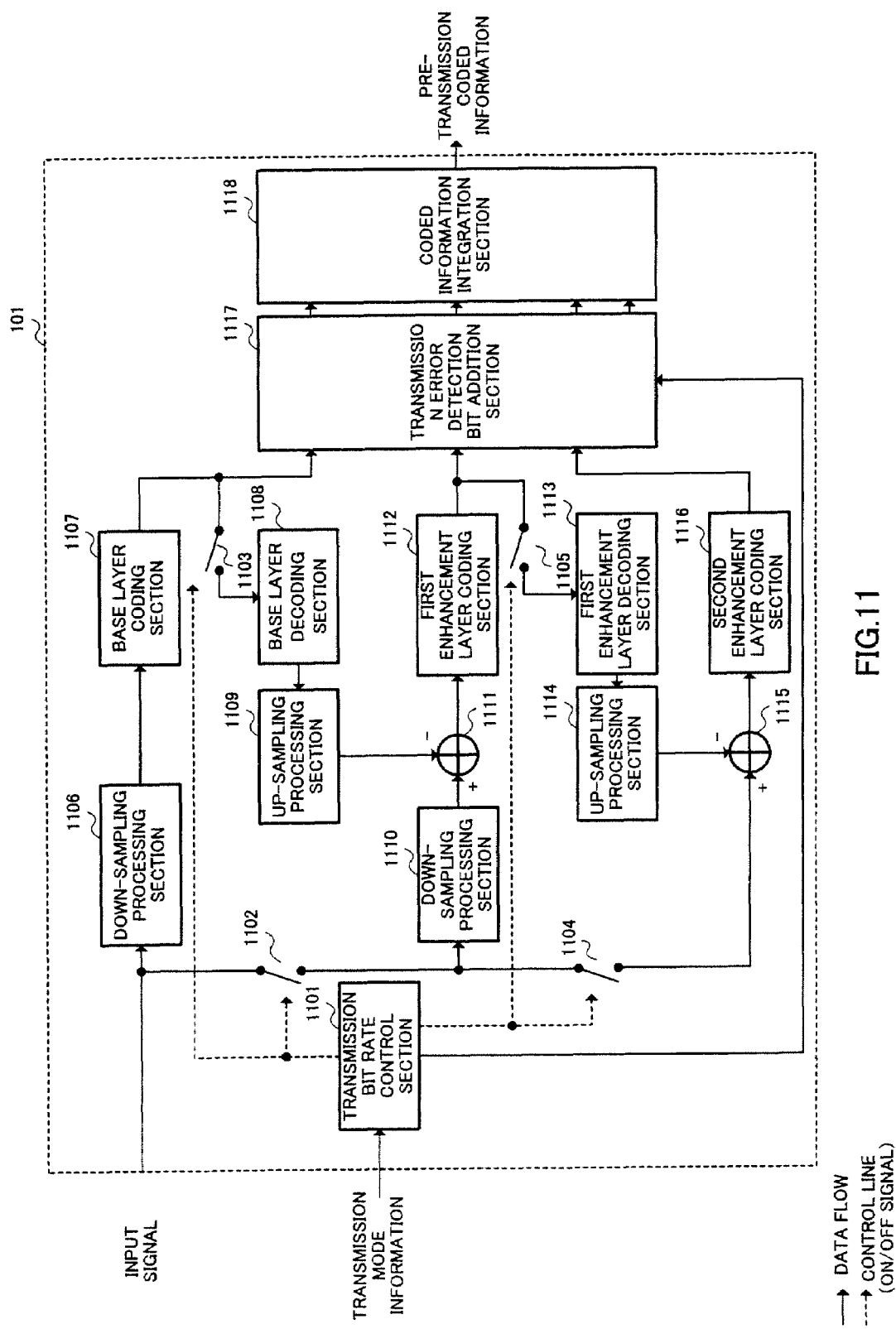
FIG. 11 is a block diagram showing an internal configuration of a signal coding apparatus that sends coded information to the signal decoding apparatus according to Embodiment 2 of the present invention.

The internal configuration of base layer coding section 1107 in FIG. 11 is the same as the internal configuration of base layer coding section 207 in FIG. 2, FIG. 3, and therefore explanations thereof will be omitted. Furthermore, the internal configuration of base layer decoding section 1108 in FIG. 11 is the same as the internal configuration of base layer decoding section 208 in FIG. 2, FIG. 4, and therefore explanations thereof will be omitted.

First enhancement layer coding section 1112, first enhancement layer decoding section 1113, second enhancement layer coding section 1116 and transmission error detection bit addition section 1117 have also been described above, and therefore explanations thereof will be omitted.

Next, the configuration of signal decoding apparatus 103 according to Embodiment 2 will be explained using FIG. 12.

Signal decoding apparatus 103 is mainly comprised of coded information operation section 1201, decoding operation control section 1202, base layer decoding section 1203, first enhancement layer decoding section 1204, second enhancement layer decoding section 1205, control switches 1206 to 1210 and sampling frequency adjustment sections 1211 and 1213.

Coded information operation section 1201 demultiplexes the transmission mode information, base layer coded information, first enhancement layer coded information and second enhancement layer coded information, and their respective transmission error detection bits included in received coded information, and performs error detection for the base layer coded information, first enhancement layer coded information and second enhancement layer coded information according to predetermined procedures using the transmission error detection bits. Then, only when no error is detected in the respective information, coded information operation section 1201 outputs the base layer coded information to base layer decoding section 1203, outputs the first enhancement layer coded information to first enhancement layer decoding section 1204 and outputs the second enhancement layer coded information to second enhancement layer decoding section 1205. The error detection procedures and transmission error detection method in coded information operation section 1201 will be described later.

Furthermore, coded information operation section 1201 stores the table shown in FIG. 13 and outputs information indicating the transmission mode information and a pattern corresponding to the error detection result (hereinafter referred to as "pattern information"), to decoding operation control section 1202. In FIG. 13, for each information, "1" is a case where error is detected, "0" is a case where no error is detected, and "-" is a case where no error detection processing is performed. For example, in FIG. 11, when transmission mode information is bitrate 1, no error is detected in the base layer coded information and first enhancement layer coded information and errors is detected in the second enhancement layer coded information, coded information operation section 1201 outputs pattern information "B" to decoding operation control section 1202.

Decoding operation control section 1202 stores the table diagram shown in FIG. 14 and performs ON/OFF control of control switches 1206 to 1210 according to the pattern information output from coded information operation section 1201. With regard to the operations of the control switch group, in FIG. 14, "ON" indicates control to "ON state," "OFF" indicates control to "OFF state." Moreover with regard to control switch 1210, "base layer side ON" indicates connecting a switch to the base layer decoding section 1203 side, "first enhancement layer side ON" indicates connecting a switch to the first enhancement layer decoding section 1204 side and "second enhancement layer side ON" indicates connecting a switch to the second enhancement layer decoding section 1205 side.

Furthermore, decoding operation control section 1202 detects whether or not to perform decoding processing (hereinafter referred to as "frame loss compensation processing") reusing codes used in earlier decoding (LPC code, adaptive excitation code, fixed excitation code, excitation gain code) according to the pattern information, and outputs information indicating the detection result to base layer decoding section 1203, first enhancement layer decoding section 1204 and second enhancement layer decoding section 1205. In FIG. 14, when the value of frame loss compensation information is "0," this means that the decoding section does not perform frame loss compensation processing. When the value is "1," this means that the decoding section performs frame loss compensation processing.

Base layer decoding section 1203 decodes the base layer coded information output from coded information operation section 1201 and generates a base layer decoded signal. On the other hand, when the frame loss compensation information output from decoding operation control section 1202 is "1," that is, when error is detected in the base layer coded information and the base layer coded information is not output from coded information operation section 1201, base layer decoding section 1203 performs frame loss compensation processing and generates a base layer decoded signal. Base layer decoding section 1203 outputs the base layer decoded signal to control switches 1206 and 1210. The internal configuration of base layer decoding section 1203 will be described later.

First enhancement layer decoding section 1204 decodes the first enhancement layer coded information output from coded information operation section 1201 and generates a first enhancement layer decoded signal. Furthermore, when the frame loss compensation information output from decoding operation control section 1202 is "1," first enhancement layer decoding section 1204 performs frame loss compensation processing and generates a first enhancement layer decoded signal. Then, first enhancement layer decoding section 1204 outputs the first enhancement layer decoded signal to control switch 1207. When the first enhancement layer coded information is not output from coded information operation section 1201 and the frame loss compensation information for the first enhancement layer output from decoding operation control section 1202 is "0," first enhancement layer decoding section 1204 performs no operation.

Second enhancement layer decoding section 1205 decodes the second enhancement layer coded information output from coded information operation section 1201 and generates a second enhancement layer decoded signal. Furthermore, when the frame loss compensation information for the second enhancement layer output from decoding operation control section 1202 is "1," second enhancement layer decoding section 1205 performs frame loss compensation processing and generates a second enhancement layer decoded signal. Then, second enhancement layer decoding section 1205 outputs the second enhancement layer decoded signal to control switch 1209. When the second enhancement layer coded information is not output from coded information operation section 1201 and the frame loss compensation information of the second enhancement layer output from decoding operation control section 1202 is "0," second enhancement layer decoding section 1205 performs no operation.

When control switch 1206 is in ON state, sampling frequency adjustment section 1211 up-samples the sampling frequency of the base layer decoded signal output from base layer decoding section 1203 from the base layer sampling frequency to the first enhancement layer sampling frequency. Furthermore, when control switch 1206 is in OFF state, sampling frequency adjustment section 1211 performs no operation.

When control switch 1209 is in ON state, sampling frequency adjustment section 1213 up-samples the sampling frequency of the signal output from addition section 1212 from the first enhancement layer sampling frequency to the input sampling frequency. Furthermore, when control switch 1206 is in OFF state, sampling frequency adjustment section 1211 performs no operation.

When control switches 1206 and 1207 are in ON state, addition section 1212 adds the signal output from sampling frequency adjustment section 1211 and the first enhancement layer decoded signal output from first enhancement layer decoding section 1204 and outputs the signal after the addition to control switches 1208 and 1210. Furthermore, when control switch 1207 is in OFF state and at the same time control switch 1206 is in ON state, addition section 1212 outputs the signal output from sampling frequency adjustment section 1211 to control switches 1208 and 1210. When control switches 1206 and 1207 are in OFF state, addition section 1212 performs no operation.

When control switches 1208, 1209 are in ON state, addition section 1214 adds up the signal output from sampling frequency adjustment section 1213 and the second enhancement layer decoded signal output from second enhancement layer decoding section 1205 and outputs the signal after the addition to control switch 1210. Furthermore, when control switch 1209 is in OFF state and control switch 1208 is in ON state, addition section 1214 outputs the signal output from sampling frequency adjustment section 1213 to control switch 1210. When control switches 1208 and 1209 are in OFF state, addition section 1214 performs no operation.

This is the explanation of the configuration of signal decoding apparatus 103 according to Embodiment 2.

Figure 9:
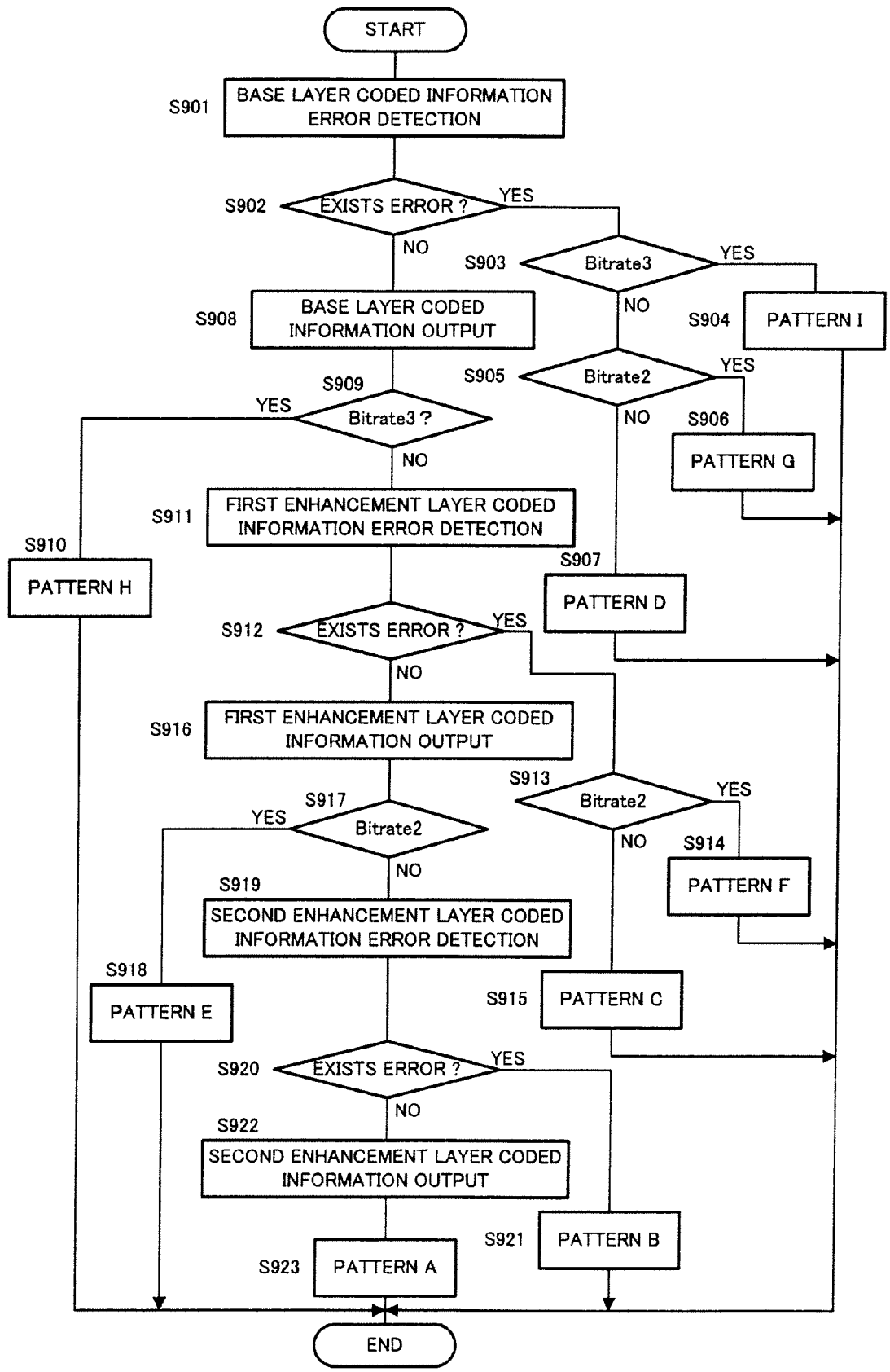
FIG. 9 is a flow chart showing error detection procedures at the coded information operation section of the signal decoding apparatus according to Embodiment 1 of the present invention.

The error detection procedure of coded information operation section 1201 is the same as that of the flow chart in FIG. 9, and therefore explanations thereof will be omitted. Furthermore, the transmission error detection method at coded information operation section 1201 and the decoding method at base layer decoding section 1203, first enhancement layer decoding section 1204 and second enhancement layer decoding section 1205 are also the same as their respective methods in Embodiment 1, and therefore explanations thereof will be omitted.

Next, the operation of signal decoding apparatus 103 will be explained for each pattern.

(Pattern A)

First, coded information operation section 1201 outputs base layer coded information to base layer decoding section 1203, outputs a first enhancement layer decoded signal to first enhancement layer decoding section 1204 and outputs a second enhancement layer decoded signal to second enhancement layer decoding section 1205.

Furthermore, as shown in FIG. 14, control switches 1206, 1207, 1208 and 1209 are set in ON state under control of decoding operation control section 1202. Furthermore, decoding operation control section 1202 substitutes "0" in all frame loss compensation information and outputs the results.

As a result, base layer decoding section 1203 performs decoding processing and outputs a base layer decoded signal. First enhancement layer decoding section 1204 performs decoding processing and outputs a first enhancement layer decoded signal. Second enhancement layer decoding section 1205 performs decoding processing and outputs a second enhancement layer decoded signal.

Furthermore, sampling frequency adjustment section 1211 up-samples the base layer decoded signal and sets the sampling frequency to $SR_{enh1}$, and sampling frequency adjustment section 1213 up-samples the signal obtained from addition section 1212 and sets the sampling frequency to $SR_{input}$. Then, the signal output from addition section 1214 is output as an output signal.

(Pattern B)

First, coded information operation section 1201 outputs base layer coded information to base layer decoding section 1203 and outputs a first enhancement layer decoded signal to first enhancement layer decoding section 1204. Coded information operation section 1201 outputs nothing to second enhancement layer decoding section 1205.

Furthermore, as shown in FIG. 14, control switches 1206, 1207 and 1208 are set in ON state and control switch 1209 is set in OFF state under control of decoding operation control section 1202. Furthermore, decoding operation control section 1202 substitutes "0" in all frame loss compensation information and outputs the results.

As a result, base layer decoding section 1203 performs decoding processing, outputs a base layer decoded signal, and first enhancement layer decoding section 1204 performs decoding processing and outputs a first enhancement layer decoded signal. Second enhancement layer decoding section 1205 performs no operation.

Furthermore, sampling frequency adjustment section 1211 up-samples the base layer decoded signal and sets the sampling frequency to $SR_{enh1}$, and sampling frequency adjustment section 1213 up-samples the signal obtained from addition section 1212 and sets the sampling frequency to $SR_{input}$. The signal output from addition section 1214 is output as an output signal.

(Pattern C)

First, coded information operation section 1201 outputs base layer coded information to base layer decoding section 1203. Coded information operation section 1201 outputs nothing to first enhancement layer decoding section 1204 and second enhancement layer decoding section 1205.

Furthermore, as shown in FIG. 14, control switches 1206 and 1208 are set in ON state and control switches 1207 and 1209 are set in OFF state under control of decoding operation control section 1202. Furthermore, decoding operation control section 1202 substitutes "0" in all frame loss compensation information and outputs the results.

As a result, base layer decoding section 1203 performs decoding processing and outputs a base layer decoded signal. First enhancement layer decoding section 1204 and second enhancement layer decoding section 1205 performs no operation.

Furthermore, sampling frequency adjustment section 1211 up-samples the base layer decoded signal and sets the sampling frequency to $SR_{enh1}$, and sampling frequency adjustment section 1213 up-samples the signal obtained from addition section 1212 and sets the sampling frequency to $SR_{input}$. The signal output from addition section 1214 is output as an output signal.

(Pattern D)

In this case, coded information operation section 1201 outputs nothing to base layer decoding section 1203, first enhancement layer decoding section 1204 and second enhancement layer decoding section 1205. Furthermore, as shown in FIG. 14, control switches 1206, 1207, 1208 and 1209 are set in ON state under control of decoding operation control section 1202. Furthermore, decoding operation control section 1202 substitutes "1" in all frame loss compensation information and outputs the results.

As a result, base layer decoding section 1203 performs frame loss compensation processing and outputs a base layer decoded signal. First enhancement layer decoding section 1204 performs frame loss compensation processing and outputs a first enhancement layer decoded signal. Second enhancement layer decoding section 1205 performs frame loss compensation processing and outputs a second enhancement layer decoded signal.

Furthermore, sampling frequency adjustment section 1211 up-samples the base layer decoded signal and sets the sampling frequency to $SR_{enh1}$, and sampling frequency adjustment section 1213 up-samples the signal obtained from addition section 1212 and sets the sampling frequency to $SR_{input}$. The signal output from addition section 1214 is output as an output signal.

(Pattern E)

First, coded information operation section 1201 outputs base layer coded information to base layer decoding section 1203 and outputs a first enhancement layer decoded signal to first enhancement layer decoding section 1204. Coded information operation section 1201 outputs nothing to second enhancement layer decoding section 1205.

Furthermore, as shown in FIG. 14, control switches 1206 and 1207 are set in ON state and control switches 1208 and 1209 are set in OFF state under the control of decoding operation control section 1202. Furthermore, decoding operation control section 1202 substitutes "0" in all loss compensation information and outputs the results.

As a result, base layer decoding section 1203 performs decoding processing and outputs a base layer decoded signal, and first enhancement layer decoding section 1204 performs decoding processing and outputs a first enhancement layer decoded signal. Second enhancement layer decoding section 1205 performs no operation.

Furthermore, sampling frequency adjustment section 1211 up-samples the base layer decoded signal and sets the sampling frequency to $SR_{enh1}$. The signal obtained from addition section 1212 is output as an output signal.

(Pattern F)

First, coded information operation section 1201 outputs base layer coded information to base layer decoding section 1203. Coded information operation section 1201 outputs nothing to first enhancement layer decoding section 1204 and second enhancement layer decoding section 1205.

Furthermore, as shown in FIG. 14, control switch 1206 is set in ON state and control switches 1207, 1208 and 1209 are set in OFF state under control of decoding operation control section 1202. Furthermore, decoding operation control section 1202 substitutes "0" in all frame loss compensation information and outputs the results.

As a result, base layer decoding section 1203 performs decoding processing and outputs a base layer decoded signal. First enhancement layer decoding section 1204 and second enhancement layer decoding section 1205 perform no operation.

Furthermore, sampling frequency adjustment section 1211 up-samples the base layer decoded signal and sets the sampling frequency to $SR_{enh1}$. The signal obtained from addition section 1212 is output as an output signal.

(Pattern G)

In this case, coded information operation section 1201 outputs nothing to base layer decoding section 1203, first enhancement layer decoding section 1204 and second enhancement layer decoding section 1205. Furthermore, as shown in FIG. 14, control switches 1206 and 1207 are set in ON state and control switches 1208 and 1209 are set in OFF state under control of decoding operation control section

1202. Furthermore, decoding operation control section 1202 substitutes "1" in the frame loss compensation information for the base layer and first enhancement layer and outputs the results and substitutes "0" in the frame loss compensation information for the second enhancement layer and outputs the results.

As a result, base layer decoding section 1203 performs frame loss compensation processing and outputs a base layer decoded signal, and first enhancement layer decoding section 1204 performs frame loss compensation processing and outputs a first enhancement layer decoded signal. Second enhancement layer decoding section 125 performs no operation.

Furthermore, sampling frequency adjustment section 1211 up-samples the base layer decoded signal and sets the sampling frequency to $SR_{enh1}$. The signal obtained from addition section 1212 is output as an output signal.

(Pattern H)

First, coded information operation section 1201 outputs base layer coded information to base layer decoding section 1203. Coded information operation section 1201 outputs nothing to first enhancement layer decoding section 1204 and second enhancement layer decoding section 1205.

Furthermore, as shown in FIG. 14, all control switches 1206, 1207, 1208 and 1209 are set in OFF state under control of decoding operation control section 1202. Furthermore, decoding operation control section 1202 substitutes "0" in all frame loss compensation information and outputs the results.

As a result, base layer decoding section 1203 performs decoding processing and outputs a base layer decoded signal. First enhancement layer decoding section 1204 and second enhancement layer decoding section 1205 perform no operation. The base layer decoded signal is output as an output signal.

(Pattern I)

In this case, coded information operation section 1201 outputs nothing to base layer decoding section 1203, first enhancement layer decoding section 1204 and second enhancement layer decoding section 1205.

Furthermore, as shown in FIG. 14, all control switches 1206, 1207, 1208 and 1209 are set in OFF state under control of decoding operation control section 1202. Furthermore, decoding operation control section 1202 substitutes "1" in the frame loss compensation information for the base layer and outputs the result, and substitutes "0" in the frame loss compensation information for the first enhancement layer and second enhancement layer and outputs the results.

As a result, base layer decoding section 1203 performs frame loss compensation processing and outputs a base layer decoded signal. First enhancement layer decoding section 1204 and second enhancement layer decoding section 1205 perform no operation. Then, the base layer decoded signal is output as an output signal.

In this way, when transmission error occurs in the ith layer (i: an integer of 2 or greater) (pattern B, C, F), this embodiment adjusts the sampling frequency of each decoded signal from the first layer to the (i−1)th layer and outputs the adjusted signal as an output signal. Furthermore, when error is detected in the base layer (pattern D, G, I), this embodiment performs frame loss compensation processing for all layers in which coded information is generated, adjusts the sampling frequency of each decoded signal obtained through this control and outputs the adjusted signal as an output signal. By this means, when signals such as scalable-coded speech/audio are decoded, even if transmission error or the like occurs in part of the coded information, it is still possible to ensure guarantee that no substantial noise will be generated.

The signal decoding apparatus according to this embodiment is not limited to decoding of coded information utilizing transmission errors occurring during transmission, and is equally applicable to cases where the number of layers to be transmitted at a relay station is reduced according to the situation channels are used (utilization rate or the like). In this case, the relay station updates transmission mode information and coded information after the reduction and adds the original transmission mode information (pre-adjustment transmission mode information) to the redundant part of the coded information. The coded information operation section of the signal decoding apparatus detects whether the coded information includes pre-adjustment transmission mode information, and, when pre-adjustment transmission mode information is included, decoding operation is performed according to the result of a comparison between the pre-adjustment transmission mode information and the transmission mode information.

Next, processing of the coded information operation section and decoding operation control section in this case will be explained. Coded information operation section 1201 stores the table shown in FIG. 15 and outputs information indicating patterns corresponding to the transmission mode information and pre-adjustment transmission mode information (hereinafter referred to as "pattern information") to decoding operation control section 1202.

Decoding operation control section 1202 stores the table shown in FIG. 16 and performs ON/OFF control of switches 1206 to 1210 according to pattern information output from coded information operation section 1001.

The processing of the base layer decoding section, first enhancement layer decoding section, second enhancement layer decoding section, sampling frequency adjustment section or the like is the same as that described above. However, the frame loss compensation processing will not be considered here.

Although cases have been described with the above embodiments where CELP type speech coding/decoding is performed, the present invention is not limited to these cases and is equally applicable to signals other than speech/audio signals such as still image and moving image.

Furthermore, the present invention is not intended to limit layers and is applicable to cases where a residual signal, which is a difference between an input signal and output signal in a lower layer, is coded in an upper layer using layered signal coding/decoding method involving plurality of layers.

Furthermore, the above described embodiments have explained the case where a CRC code is used as the transmission error detection bit, but the present invention does not place limits on codes to detect or correct transmission errors. Furthermore, a plurality of transmission error detection bits may be used such as calculating a convolutional code after calculating a CRC code. Here, the transmission mode information is extremely important information for a scalable coding/decoding scheme, and therefore it is desirable to add codes having not only the transmission error detection function but also error correction function.

Figure 12:
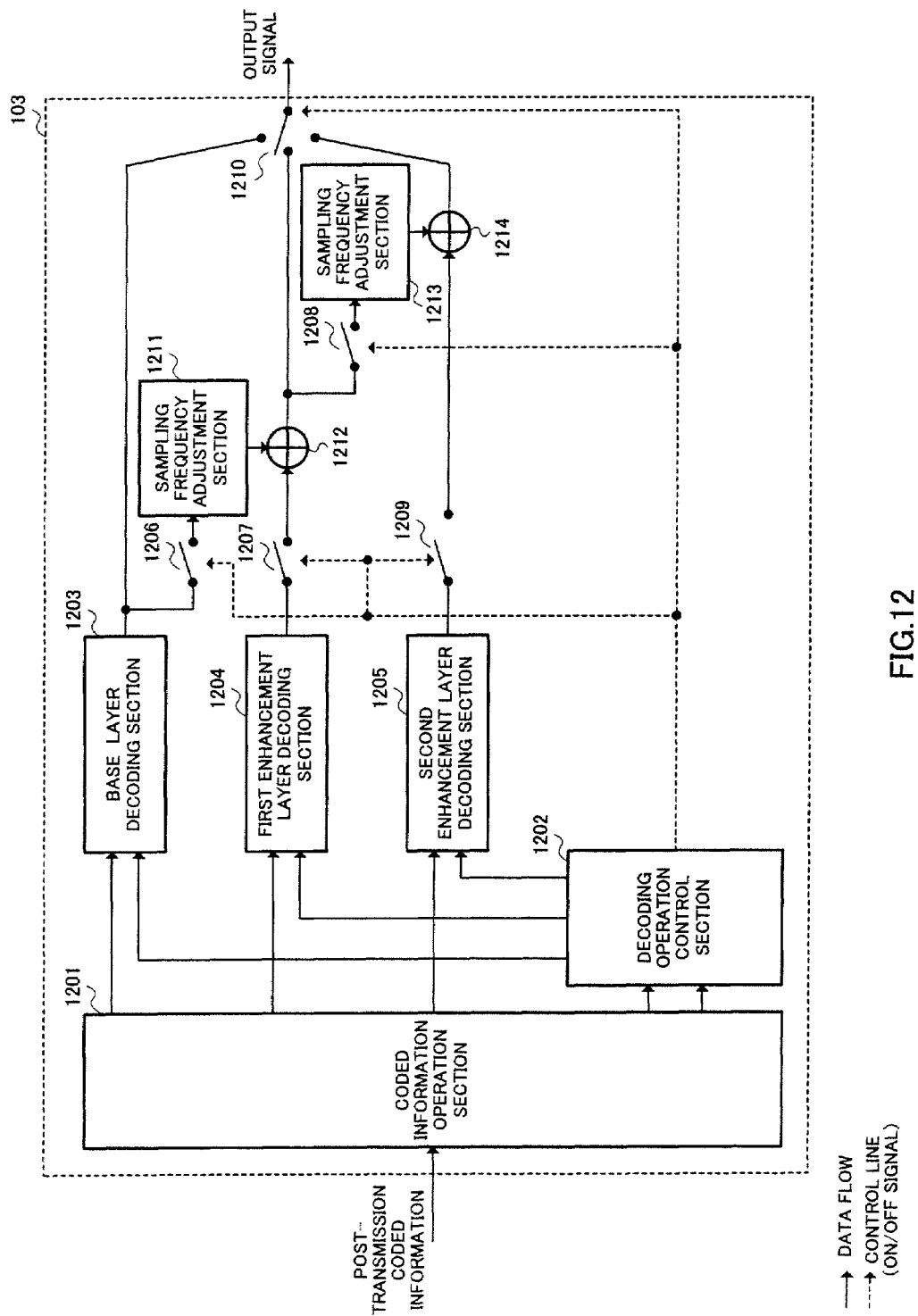
FIG. 12 is a block diagram showing an internal configuration of the signal decoding apparatus according to Embodiment 2 of the present invention.

Furthermore, the present invention is also applicable to a case where the configuration shown in FIG. 6 of Embodiment 1 or FIG. 12 of Embodiment 2 is recorded, written into a machine-readable recording medium such as memory, disk, tape, CD, DVD and then operated.

Embodiment 3

Figure 17:
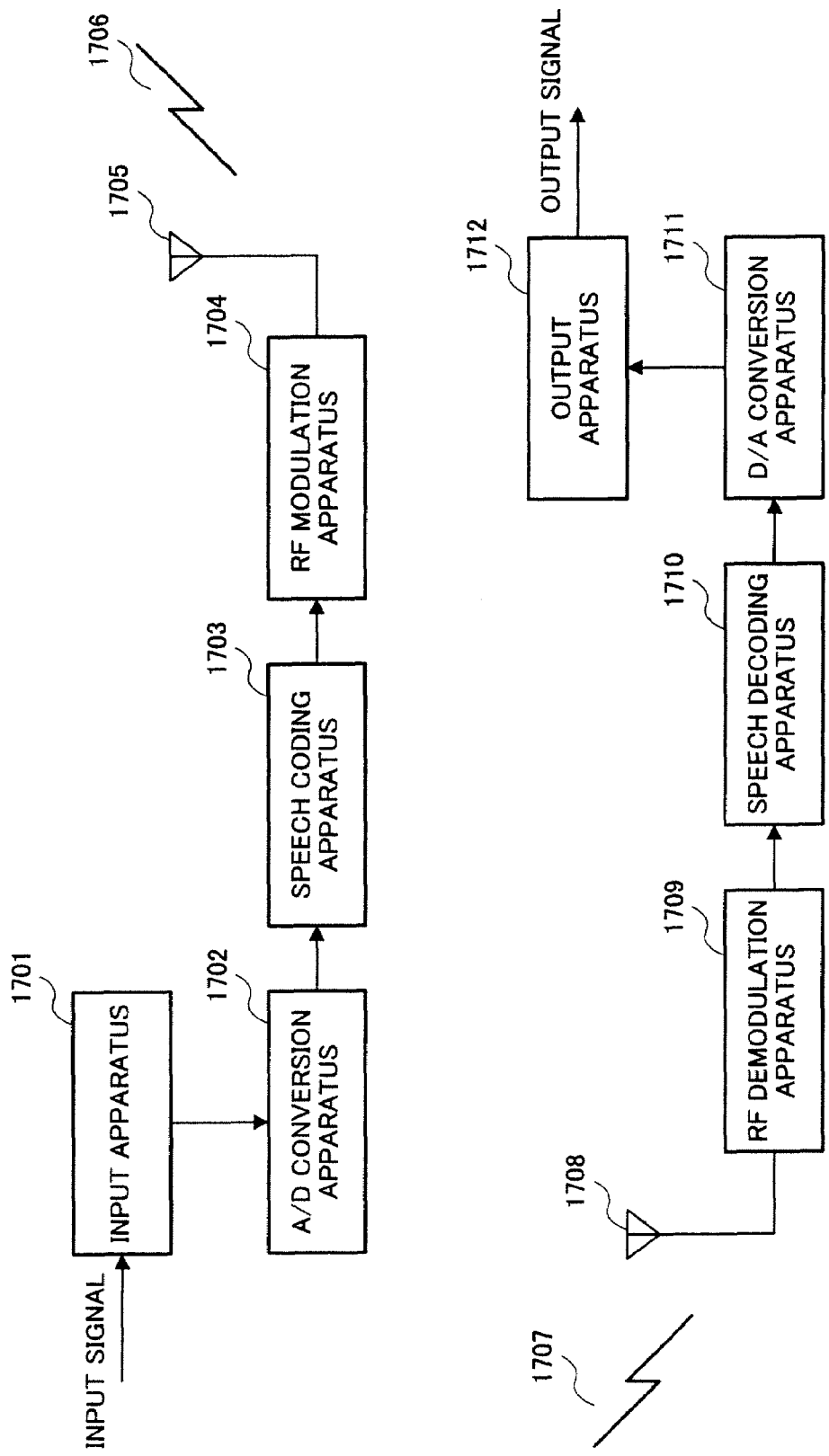
FIG. 17 is a block diagram showing configurations of a signal transmission apparatus and signal reception apparatus according to Embodiment 3 of the present invention.

FIG. 17 is a block diagram showing the configurations of a signal transmission apparatus and a signal reception apparatus including the signal coding apparatus and the signal decoding apparatus explained in above described Embodiment 1 and Embodiment 2. A case where speech signals are transmitted and received will be explained using FIG. 17 below.

In FIG. 17, a speech signal is converted to an electric signal by input apparatus 1701 and output to A/D conversion apparatus 1702. A/D conversion apparatus 1702 converts the (analog) signal output from input apparatus 1701 to a digital signal and outputs the digital signal to speech coding apparatus 1703. Speech coding apparatus 1703 is provided with signal coding apparatus 101 shown in FIG. 1, performs coding of the digital speech signal output from A/D conversion apparatus 1702 and outputs the coded information to RF modulation apparatus 1704. RF modulation apparatus 1704 converts the coded information output from speech coding apparatus 1703 to a signal to be transmitted on a propagation medium such as radio wave and outputs the signal to transmission antenna 1705. Transmission antenna 1705 transmits the output signal output from RF modulation apparatus 1704 as a radio wave (RF signal). RF signal 1706 in the figure represent the radio wave (RF signal) transmitted from transmission antenna 1705.

RF signal 1707 is received by reception antenna 1708 and output to RF demodulation apparatus 1709. RF signal 1707 in the figure represent a radio wave received by reception antenna 1708, which is totally the same as RF signal 1706 unless there are signal attenuation and superimposition of noise over the propagation path.

RF demodulation apparatus 1709 demodulates the coded information from the RF signal output from reception antenna 1708 and outputs the result to speech decoding apparatus 1710. Speech decoding apparatus 1710 is provided with signal decoding apparatus 103 shown in FIG. 1, decodes the speech signal from the voice coded information output from RF demodulation apparatus 1709 and outputs a digital decoded speech signal obtained to D/A conversion apparatus 1711. D/A conversion apparatus 1711 converts the digital speech signal output from speech decoding apparatus 1710 to an analog electric signal and outputs the analog electric signal to output apparatus 1712.

Output apparatus 1712 converts the electric signal to air vibration and outputs the vibration in a manner that is audible to human ears as a sound wave.

Providing the above-described speech signal transmission apparatus and speech signal reception apparatus in a base station apparatus and a communication terminal apparatus in a radio communication system makes it possible to obtain a high quality output signals. Although a case has been described above with this embodiment where a speech signal is used as the input signal, the present invention is equally applicable to any signals other than speech signals.

The present application is based on Japanese Patent Application No. 2004-003402, filed on Jan. 8, 2004 and Japanese Patent Application No. 2004-224240, filed on Jul. 30, 2004, the entire content of which is expressly incorporated by reference herein.

INDUSTRIAL APPLICABILITY

The present invention is suitable for use in a signal decoding apparatus used in the fields of a packet communication system represented by Internet communication, non-packet communication system, mobile communication system, car navigation system or the like.

The invention claimed is:

1. A signal decoding apparatus that decodes coded information formed with n layers, n being an integer of two or greater, the signal decoding apparatus comprising:
    a coded information operation section that performs error detection for the coded information per layer;
    a decoding section that, when no error is detected in m layers, m being an integer of one or greater and n or less, decodes coded information of the m layers, per layer, and generates m decoded signals, and that, when a frame is lost in an i-th layer, i being an integer of two or greater and n or less, decodes coded information of a first to (i−1)-th layers, per layer, and generates (i−1) decoded signals;
    a sampling frequency adjustment section that adjusts sampling frequencies of all decoded signals generated, to sampling frequencies in accordance with transmission mode employed upon transmission; and
    an addition section that adds all the decoded signals with adjusted sampling frequencies.

2. The signal decoding apparatus according to claim 1, wherein:
    the coded information comprises a coded speech signal; and
    the decoding section decodes the coded information using a coded excited linear prediction type decoding method and generates a decoded signal.

3. A computer readable recording medium that records a program for a computer to execute, wherein the program comprises:
    a coded information operation step of performing error detection of coded information formed with n layers, n being an integer of two or greater, per layer;
    a decoding step of, when no error is detected in m layers, m being an integer of one or greater and n or less, decoding coded information of the m layers, per layer, and generating m decoded signals, and, when a frame is lost in an i-th layer, i being an integer of two or greater and n or less, decoding coded information of a first to (i−1)-th layers, per layer, and generating (i−1) decoded signals;
    a sampling frequency adjustment step of adjusting sampling frequencies of all decoded signals generated, to sampling frequencies in accordance with transmission mode employed upon transmission; and
    an adding step of adding all the decoded signals with adjusted sampling frequencies.

4. A signal decoding method of decoding coded information formed with n layers, n being an integer of two or greater, the signal decoding apparatus comprising:
    a coded information operation step of performing error detection for the coded information per layer;
    a decoding step of, when no error is detected in m layers, m being an integer of one or greater and n or less, decoding coded information of the m layers, per layer, and generating m decoded signals, and, when a frame is lost in an i-th layer, i being an integer of two or greater and n or less, decoding coded information of a first to (i−1)-th layers and generating (i−1) decoded signals;

a sampling frequency adjustment step of adjusting sampling frequencies of all decoded signals generated, to sampling frequencies in accordance with transmission mode employed upon transmission; and an adding step of adding all the decoded signals with adjusted sampling frequencies.

* * * * *